US 12,461,050 B2

(12) United States Patent
Matthews et al.

(10) Patent No.: US 12,461,050 B2
(45) Date of Patent: *Nov. 4, 2025

(54) SYSTEM AND DEVICES FOR MONITORING CELL-CONTAINING MATERIALS AND METHODS OF THEIR USE

(71) Applicant: CORNELL UNIVERSITY, Ithaca, NY (US)

(72) Inventors: Jared Matthews, Ithaca, NY (US); Lawrence Bonassar, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,910

(22) Filed: May 21, 2024

(65) Prior Publication Data
US 2025/0020609 A1    Jan. 16, 2025

Related U.S. Application Data

(63) Continuation of application No. 17/039,234, filed on Sep. 30, 2020, now Pat. No. 12,019,040.
(Continued)

(51) Int. Cl.
G01N 27/02 (2006.01)
G01N 1/10 (2006.01)
G01N 27/06 (2006.01)

(52) U.S. Cl.
CPC ........... *G01N 27/026* (2013.01); *G01N 27/06* (2013.01); *G01N 2001/1012* (2013.01)

(58) Field of Classification Search
CPC ............... G01N 27/026; G01N 27/06; G01N 2001/1012; G01N 2015/1062; G01N 15/10
See application file for complete search history.

(56) References Cited

U.S. PATENT DOCUMENTS 6,287,874 B1  9/2001  Hefti
7,051,654 B2  5/2006  Boland et al.
(Continued)

FOREIGN PATENT DOCUMENTS

AU   2016206289 A1   8/2016
WO   2009006456 A1   1/2009
(Continued)

OTHER PUBLICATIONS

Bagnaninchi et al., "Towards on-line Monitoring of Cell Growth in Microporous Scaffolds: Utilization and Interpretation of Complex Permittivity Measurements," Biotechnology and bioengineering 84(3):343-50 (2003).
(Continued)

*Primary Examiner* — Lee E Rodak
*Assistant Examiner* — Zannatul Ferdous
(74) *Attorney, Agent, or Firm* — Troutman Pepper Locke LLP (Rochester)

(57) ABSTRACT

The present application is directed to a system for collecting or extruding a cell-containing biological material. The system includes an extrusion/collection device comprising: an orifice and a chamber operably connected to the orifice and an electrical impedance spectroscopy (EIS) device, operably connected to the extrusion/collection device. The EIS device monitors biologically relevant attributes of a cell-containing biological material as it is extruded from or collected into the extrusion/collection device. Also disclosed are methods of using the system disclosed herein.

28 Claims, 23 Drawing Sheets

Related U.S. Application Data

(60) Provisional application No. 62/908,329, filed on Sep. 30, 2019.

(56) References Cited

U.S. PATENT DOCUMENTS

| | | | |
|---|---|---|---|
| 7,939,003 B2 | 5/2011 | Bonassar et al. | |
| 8,420,404 B2 | 4/2013 | Diebold et al. | |
| 8,636,938 B2 | 1/2014 | Bonassar et al. | |
| 8,877,112 B2 | 11/2014 | Bonassar et al. | |
| 9,121,806 B1 | 9/2015 | Bhansali et al. | |
| 9,242,031 B2 | 1/2016 | Bonassar et al. | |
| 9,274,071 B2 | 3/2016 | Potyrailo et al. | |
| 9,506,908 B2 | 11/2016 | Pennathur et al. | |
| 9,568,449 B2 | 2/2017 | Downey et al. | |
| 9,664,632 B2 | 5/2017 | Wang et al. | |
| 9,855,369 B2 | 1/2018 | Murphy et al. | |
| 9,937,522 B2 | 4/2018 | Hart et al. | |
| 9,976,973 B2 | 5/2018 | Walkins et al. | |
| 9,983,195 B2 | 5/2018 | King et al. | |
| 10,018,581 B2 | 7/2018 | Wang et al. | |
| 10,041,929 B2 | 8/2018 | Just et al. | |
| 10,082,477 B2 | 9/2018 | Suzuki et al. | |
| 10,094,821 B2 | 10/2018 | Nguyen et al. | |
| 10,098,581 B2 | 10/2018 | Voldman et al. | |
| 10,174,276 B2 | 1/2019 | Murphy et al. | |
| 10,234,376 B2 * | 3/2019 | Turick | G01N 17/02 |
| 10,240,182 B2 | 3/2019 | Bauer | |
| 10,345,217 B2 | 7/2019 | Wanders et al. | |
| 10,429,292 B2 | 10/2019 | Adams et al. | |
| 10,436,699 B2 | 10/2019 | Nagai | |
| 10,473,605 B2 | 11/2019 | Lu et al. | |
| 10,495,594 B2 | 12/2019 | Lu et al. | |
| 10,502,674 B2 | 12/2019 | Di Carlo et al. | |
| 10,527,568 B2 | 1/2020 | Watkins et al. | |
| 10,605,805 B2 | 3/2020 | Chou et al. | |
| 10,627,389 B2 | 4/2020 | Shults et al. | |
| 10,634,660 B2 | 4/2020 | Brun et al. | |
| 10,638,947 B2 | 5/2020 | Varsavsky et al. | |
| 10,641,724 B2 | 5/2020 | Ainger et al. | |
| 10,660,555 B2 | 5/2020 | Wang et al. | |
| 10,746,680 B2 | 8/2020 | Potyrailo et al. | |
| 11,517,222 B2 * | 12/2022 | Pushpala | A61B 5/685 |
| 12,019,040 B2 * | 6/2024 | Matthews | G01N 27/06 |
| 2003/0072549 A1 | 4/2003 | Facer et al. | |
| 2004/0014045 A1 | 1/2004 | Chapman et al. | |
| 2010/0136606 A1 | 6/2010 | Katsumoto et al. | |
| 2011/0028341 A1 | 2/2011 | Wang et al. | |
| 2011/0312518 A1 | 12/2011 | Davis et al. | |
| 2012/0061257 A1 * | 3/2012 | Yu | A61B 5/0537 205/792 |
| 2013/0331676 A1 * | 12/2013 | Morgan | A61B 5/6849 600/365 |
| 2015/0335681 A1 * | 11/2015 | Chapman | A61K 27/3604 424/93.3 |
| 2016/0029920 A1 | 2/2016 | Kronström et al. | |
| 2016/0131572 A1 | 5/2016 | Klein | |
| 2017/0135641 A1 | 5/2017 | Lee et al. | |
| 2017/0266438 A1 * | 9/2017 | Sano | A61N 1/327 |
| 2018/0072981 A1 | 3/2018 | Armani et al. | |
| 2018/0259473 A1 | 9/2018 | Mohseni et al. | |
| 2018/0338765 A1 * | 11/2018 | Judy | A61L 31/028 |
| 2019/0154603 A1 | 5/2019 | Suster et al. | |
| 2020/0315504 A1 * | 10/2020 | Lin | C12Q 1/002 |

FOREIGN PATENT DOCUMENTS

| | | |
|---|---|---|
| WO | 2010140127 A1 | 12/2010 |
| WO | 2011106792 A2 | 9/2011 |
| WO | 2014008424 A1 | 1/2014 |

OTHER PUBLICATIONS

Bagnaninchi et al., "Complex Permittivity Measurement as a New Noninvasive Tool for Monitoring in Vitro Tissue Engineering and Cell Signature through the Detection of Cell Proliferation, Differentiation, and Pretissue Formation," IEEE Transactions on Nanobioscience 3(4):243-50 (2004).

Bao et al., "Broadband Dielectric Spectroscopy of Cell Cultures," in IEEE Transactions on Microwave Theory and Techniques 66(12):5750-5759 (2018).

Burdette et al., "In Vivo Probe Measurement Technique for Determining Dielectric Properties at VHF through Microwave Frequencies," in IEEE Transactions on Microwave Theory and Techniques 28(4):414-427 (1980).

Daoud et al., "Dielectric Spectroscopy for Non-Invasive Monitoring of Epithelial Cell Differentiation within Three-Dimensional Scaffolds," Physics in Medicine and Biology 5(16):5097-112 (2012).

Du, E et al., "Electric Impedance Microflow Cytometry for Characterization of Cell Disease States." Lab on a Chip 13 (19):3903-3909 (2013).

Dziong et al., "Nondestructive Online in Vitro Monitoring of Pre-Osteoblast Cell Proliferation within Microporous Polymer Scaffolds," IEEE transactions on Nanobioscience 6(3):249-58 (2007).

Filali et al., "Design and Calibration of a Large Open-Ended Coaxial Probe for the Measurement of the Dielectric Properties of Concrete," in IEEE Transactions on Microwave Theory and Techniques 56(10):2322-2328 (2008).

Foster et al., "Dielectric Properties of Brain Tissue Between 0.01 and 10 GHZ," Physics in Medicine and Biology 24 (6):1177-87 (1979).

Gabriel et al., "Admittance Models for Open Ended Coaxial Probes and their Place in Dielectric Spectroscopy," Physics in Medicine and Biology 39(12):2183-200 (1994).

Gabriel et al., "The Dielectric Properties of Biological Tissues: I. Literature Survey," Physics in Medicine and Biology 41 (11):2231-49 (1996).

Gawad et al., "Micromachined Impedance Spectroscopy Flow Cytometer for Cell Analysis and Particle Sizing," Lab on a chip 1(1):76-82 (2001).

Grossi and Riccò, "Electrical Impedance Spectroscopy (EIS) for Biological Analysis and Food Characterization: A Review," J. Sens. Sens. Syst. 6:303-325 (2017).

Gu and Zhao, "Cellular Electrical Impedance Spectroscopy: An Emerging Technology of Microscale Biosensors," Expert Review of Medical Devices 7(6):767-79 (2010).

Heileman et al., "Dielectric Spectroscopy as a Viable Biosensing Tool for Cell and Tissue Characterization and Analysis," Biosensors & Bioelectronics 49:348-59 (2013).

La Gioia et al., "Open-Ended Coaxial Probe Technique for Dielectric Measurement of Biological Tissues: Challenges and Common Practices," Diagnostics (Basel, Switzerland) 8(2):40 (2018).

Lei, Kin, "Review on Impedance Detection of Cellular Responses in Micro/Nano Environment," Micromachines 5(1):1-12 (2014).

Levitskaya and Sternberg, "Laboratory Measurement of Material Electrical Properties: Extending the Application of Lumped-Circuit Equivalent Models to 1 GHZ," Radio Science 35(2):371-383 (2000).

Maalouf et al., "Label-Free Detection of Bacteria by Electrochemical Impedance Spectroscopy: Comparison to Surface Plasmon Resonance," Analytical chemistry 79(13):4879-86 (2007).

Mansor et al. "Electrical Impedance Spectroscopy for Detection of Cells in Suspensions Using Microfluidic Device with Integrated Microneedles," Applied Sciences 7(2): 170 (2017).

Marsland and Evans, Dielectric Measurements with an Open-Ended Coaxial Probe, IEE Proceedings 134:341-349 (1987).

Meaney et al., "Microwave Open-Ended Coaxial Dielectric Probe: Interpretation of the Sensing Volume Re-Visited." BMC Medical Physics 14(3):1-11 (2014).

Montero-Rodríguez et al., "Development of an Impedance Spectroscopy Device for On-Line Cell Growth Monitoring," Electron. Lett. 53:1025-1027 (2017).

Narayanan et al. "Investigating Dielectric Impedance Spectroscopy as a Non-Destructive Quality Assessment Tool for 3D Cellular Constructs." Proceedings of the ASME 2017 12th International Manufacturing Science and Engineering Conference collocated with the JSME/ASME 2017 6th International Conference on Mate-

(56) References Cited

OTHER PUBLICATIONS rials and Processing. vol. 4: Bio and Sustainable Manufacturing. Los Angeles, California, USA. Jun. 4-8, 2017.

Narayanan et al. "Label Free Process Monitoring of 3D Bioprinted Engineered Constructs via Dielectric Impedance Spectroscopy," Biofabrication 10(3):035012 (2018).

Nguyen et al., "Microfluidic Chip with Integrated Electrical Cell-Impedance Sensing for Monitoring Single Cancer Cell Migration in Three-Dimensional Matrixes," Analytical Chemistry 85(22):11068-76 (2013).

Ruiz-Vargas et al., "A Portable Bioimpedance Measurement System Based on Red Pitaya for Monitoring and Detecting Abnormalities in the Gastrointestinal Tract," IEEE EMBS Conference on Biomedical Engineering and Sciences (IECBES), Kuala Lumpur, Malaysia, pp. 150-154 (2016).

Suehiro et al., "Quantitative Estimation of Biological Cell Concentration Suspended in Aqueous Medium by Using Dielectrophoretic Impedance Measurement Method," Journal of Physics D: Applied Physics 32(21):2814-2820 (1999).

Yardley et al., "On-line, Real-Time Measurements of Cellular Biomass Using Dielectric Spectroscopy," Biotechnology & Genetic Engineering Reviews 17:3-35 (2000).

Zajíček et al., "Evaluation of a Reflection Method on an Open-Ended Coaxial Line and its use in Dielectric Measurements," Acta Polytechnica 46(5) (2006).

Zhbanov and Yang, "Electrochemical Impedance Spectroscopy of Blood for Sensitive Detection of Blood Hematocrit, Sedimentation and Dielectric Properties," Analytical Methods 3302-3313 (2017).

Zhu et al., "Time-Lapse Electrical Impedance Spectroscopy for Monitoring the Cell Cycle of Single Immobilized S. Pombe Cells," Scientific Reports 5:17180 (2015).

Real Time Monitoring of Critical Quality Attributes of Bioprinted Constructions in Manufacturing of Engineered Tissues. Directorate for Engineering Grant No. 1562139 to Binil Starly.

Impedance Spectroscopy for Manufacturing Control of Material Physical Properties. Master of Science in Electrical Engineering Thesis of Xiaobei Li. University of Washington. (2003).

Macdonald, J. Ross, and William B. Johnson. "Fundamentals of Impedance Spectroscopy," Impedance Spectroscopy: Theory, Experiment, and Applications 1-26 (2005).

Zia, Asif Iqbal, and Subhas Chandra Mukhopadhyay. Electrochemical Sensing: Carcinogens in Beverages. vol. 20. Cham, Switzerland: Springer, 2016.

Robert Jan Kortschot, "Dielectric Spectroscopy of Colloidal Quantum Dots in Apolar Liquids," (1985).

Haring et al., "3D Bioprinting Using Hollow Multifunctional Fiber Impedimetric Sensors," Biofabrication 12(3):035026 (2020).

Dielectrics: An Overview of Dielectric Theory by Cornell's Prof. Tomas Arias, Department of Physics, Cornell University Oct. 14, 2012.

Seol et al., "Bioprinting Technology and Its Applications," European Journal of Cardio.Thoracic Surgery 46:342-348 (2014).

Varshney & Li, "Interdigitated Array Microelectrode Based Impedance Biosensor Coupled with Magnetic Nanoparticle-antibody Conjugates for Detection of *Excherichia coli* O157:H7 in Food Samples," Biosens. Bioelectron. 22(11):2408-14 (2007).

Reitinger et al., "Electrical Impedance Sensing in Cell.substrates for Rapid and Selective Multipotential Differentiation Capacity Monitoring of Human Mesenchymal Stem Cells," Biosens. Bioelectron. 34(1):63-9 (2012).

Bur et al., "In-Line Monitoring of Dielectric and Fluorescence Spectroscopy During Polymer/Filler Compounding," Plastics, Rubbers and Composites 33(1):5-10 (2004).

Landoulsi et al., "A Microfluidic Sensor Dedicated to Microwave Dielectric Spectroscopy of Liquids Medium and Flowing Colloidal Suspension," Procedia Engineering 87:504-507 (2014).

Downey et al., "A Novel Approach for Using Dielectric Spectroscopy to Predict Viable Cell Volume (VCV) in Early Process Development," Biotechnol. Prog. 30(2):479-487 (2014).

Matthews and Bonassar, "Feasibility of a Low-cost Electrical Impedance Spectrometer for Investigating Cell-Saline Suspensions," 2019 BMES Annual Meeting, Poster Presentation, Oct. 19, 2019.

Matthews and Bonassar, "Feasibility of a Low-cost Electrical Impedance Spectrometer for Investigating Cell-Saline Suspensions," 2019 BMES Annual Meeting (Oct. 19, 2019).

\* cited by examiner ized sputtering machines for an ultimately restricted
SYSTEM AND DEVICES FOR MONITORING CELL-CONTAINING MATERIALS AND METHODS OF THEIR USE This application is a continuation of U.S. patent application Ser. No. 17/039,234, filed Sep. 30, 2020, which claims the priority benefit of U.S. Provisional patent application Ser. No. 62/908,329, filed Sep. 30, 2019, all of which are hereby incorporated by reference in their entirety.

FIELD

The present application is directed to a system for collecting or extruding a cell-containing biological material, which is capable of monitoring biologically relevant attributes of the cell-containing biological material.

BACKGROUND

Bioprinting—the application of three-dimensional (3D) printing techniques to biological research—has significant potential to address challenges in tissue engineering. The repeatability, tunability, and high precision present in more established polymer 3D printing, which typically involves the extrusion or polymerization of acellular plastics, is ideal for the fabrication of microstructures present in tissues, and researchers engaged with bioprinting technology hope to leverage these advantages to produce novel tissue analogs (Seol et al., "Bioprinting Technology and Its Applications," *European Journal of Cardio-Thoracic Surgery* 46:342-348 (2014); Narayanan et al., "Label Free Process Monitoring of 3D Bioprinted Engineered Constructs Via Dielectric Impedance Spectroscopy," *Biofabrication*, 10 (2018)).

However, the inherent dynamism of biological systems complicates the otherwise straightforward approaches present in polymer printing. Namely, the critical quality attributes ("CQAs") of a bioprinted construct, such as cell live/dead counts, cell volume fraction, and cell distribution within the construct, determine functional efficacy of the tissue analog and are difficult to control or monitor directly. The discrepancy between the importance of CQAs and their current ability to be accounted for in bioprinting practice necessitates the creation of an on-line bioprinter monitoring system. Such a device would expedite bioprinting research by providing real-time, quantitative evaluation of CQAs, strengthening the connection between construct design and the fabrication process (Narayanan et al., "Label Free Process Monitoring of 3D Bioprinted Engineered Constructs Via Dielectric Impedance Spectroscopy," *Biofabrication* 10 (2018)).

Electrical impedance spectroscopy ("EIS") is an established measurement technique for quantifying cell viability that leverages the changes in the complex impedance of a device under test ("DUT") occurring due to the introduction of cells.

Electrical impedance spectroscopy has been used in biomedical applications. U.S. Patent Application Publication No. 2016/0029920 describes a needle that uses electrical impedance spectroscopy to detect various tissue types (e.g., to detect when the needle has penetrated spinal fluid). The needle incorporates two electrodes; one electrode is incorporated into a needle, and the other is incorporated into a stylet located inside the needle. After the target location has been detected, the stylet needs to be removed and then a syringe or other device must be connected to the needle before the procedure (e.g., injection or fluid collection) can begin. However, this device does not provide a biological quality control or diagnostic function for contents from the device being delivered or external biological materials being collected.

U.S. Patent Application Publication No. 2017/0135641 teaches a syringe needle comprising multiple interdigitated electrodes ("IDEs") placed on a surface of a portion of the syringe needle spaced apart from a tip of the syringe needle and formed of a first metal and a pair of interconnection lines for electrical connection of the multiple IDEs, the interconnection lines electrically connecting a first group of the IDEs on the left and a second group of the IDEs on the right through one end of each of the interconnection lines. The multiple IDEs are formed of a material for a dielectric layer and are alternately arranged at first distance from one another. This speaks to manufacturing techniques for syringe needles with biosensing capability. The described process for producing a biosensing platform requires sophisticated sputtering machines for an ultimately restricted device; changing syringe tips (say, for accommodating more viscous materials) requires an entirely new sensor. The device does not allow for interchangeability with any standard Luer fitting needle.

Mansor et al., "Electrical Impedance Spectroscopy for Detection of Cells in Suspensions Using Microfluidic Device with Integrated Microneedles," *Applied Sciences* 7:170 (2017) describes a microfluidic device with integrated microneedles. The two microneedles are placed at the half height of the microchannel for cell detection and electrical measurement. The device is said to be capable of detecting passing cells at the sensing area, which could be used for low-cost medical and food safety screening and testing processes. However, the device, owing to the micron-scale of operation, requires precision tolerancing and manufacturing. Further, the device requires an external pump to drive fluid through the investigative volume, increasing the cost and complexity of the system. The small channel diameter also reduces the applicability of the device, as viscous biologically relevant materials such as hydrogels can prove challenging to investigate with micro-scale channels.

The present application is directed to overcoming these and other limitations in the art.

SUMMARY

One aspect of the present application relates to a system for collecting or extruding a cell-containing biological material. The system comprises an extrusion/collection device comprising an orifice and a chamber operably connected to the orifice. The system also includes an electrical impedance spectroscopy (EIS) device, operably connected to the extrusion/collection device, where the EIS device monitors biologically relevant attributes of a cell-containing biological material as it is extruded from or collected into the extrusion/collection device.

Another aspect of the present application relates to a method of depositing a cell-containing biological material. This method involves providing a system as described herein; extruding from the extrusion/collection device a cell-containing biological material; and monitoring biologically relevant attributes of the cell-containing biological material as it is extruded from the extrusion/collection device.

A further aspect of the present application relates to a method of collecting a cell-containing biological material. This method involves providing a system as described herein; collecting into the extrusion/collection device a cell-containing biological material; and monitoring biologically relevant attributes of the cell-containing biological material as it is collected into the extrusion/collection device.

Another aspect of the present application is directed to a system for collecting or extruding a cell-containing biological material. This system includes a syringe device comprising a housing having opposed distal and proximal ends, where the distal end is provided with an orifice; a fitting connected at the orifice for interchangeably connecting a needle; a plunger axially movable within the housing between an advanced position near the distal end and a retracted position near the proximal end; an elongate rod being connected to said plunger to move said plunger axially between the advanced and retracted positions, and extending through the proximal end of the housing; and an electrical impedance spectroscopy (EIS) device operably connected to the syringe device at the fitting, where the EIS device comprises anti-parallel electrodes positioned in the fitting to create an electrical field for detecting impedance of a cell-containing biological material as it is extruded from or collected into the syringe device.

A further aspect of the present application is directed to an electrical impedance spectroscopy (EIS) device connectable to an extrusion/collection device, where the EIS device comprises anti-parallel electrodes configured to create an electrical field around a fluid passageway for detecting impedance of a cell-containing biological material as it moves through the passageway.

The present application is directed to a system that integrates EIS techniques into an extrusion/collection device that may be employed in a bioprinter environment, for example, to enable measuring of impedance as both a function of suspended cell concentration and applied frequency. Based on the experimentation provided herein, EIS can be used to count cells in real time when entering or leaving the device, such as a syringe, for a variety of applications, including measuring cells harvested from a patient at point of care, measuring cells delivered to a patient for cell therapy, or documenting the number of cells deposited in an implant during tissue printing. In addition, the potential to use information obtained from these measurements to perform closed loop control to deliver a precise number of cells to a patient or deposit a controlled number of cells in a printed or molded implant is disclosed. This control would be accomplished via closed loop feedback using information obtained from the device and coupling this through an electromechanical control system. Using this information, a feedback controller could be used to the number of cells delivered through multiple mechanisms, including the total volume or volumetric flow rate from the device.

BRIEF DESCRIPTION OF THE DRAWINGS

FIG. 5A is a side view of the Luer type fitting without electrodes. FIG. 5B is a side view of the Luer type fitting with electrodes. FIG. 5C is a top view showing exposed electrodes in the fluid passage of a standard Luer type fitting. FIG. 5D is an exploded, side view of a standard Luer type fitting machined to have holes into which electrodes are placed for EIS measurements.

DETAILED DESCRIPTION

One aspect of the present application relates to a system for collecting or extruding a cell-containing biological material. The system comprises an extrusion/collection device comprising an orifice and a chamber operably connected to the orifice. The device also includes an electrical impedance spectroscopy (EIS) device, operably connected to the extrusion/collection device, where the EIS device monitors biologically relevant attributes of a cell-containing biological material as it is extruded from or collected into the extrusion/collection device.

In some embodiments, this aspect of the present application relates to a system comprising an in-line impedance spectrometer that is capable of monitoring biologically relevant attributes of a cell-containing biological material as it is extruded from an extrusion device (e.g., in a bioprinting context, or in administering a cell-containing solution to a subject as part of cell therapy) or as it is collected into a collection device (e.g., from a subject or an in vitro setting). Monitoring is accomplished through an in-line impedance spectrometer operably coupled to an extrusion/collection device.

Figure 1:
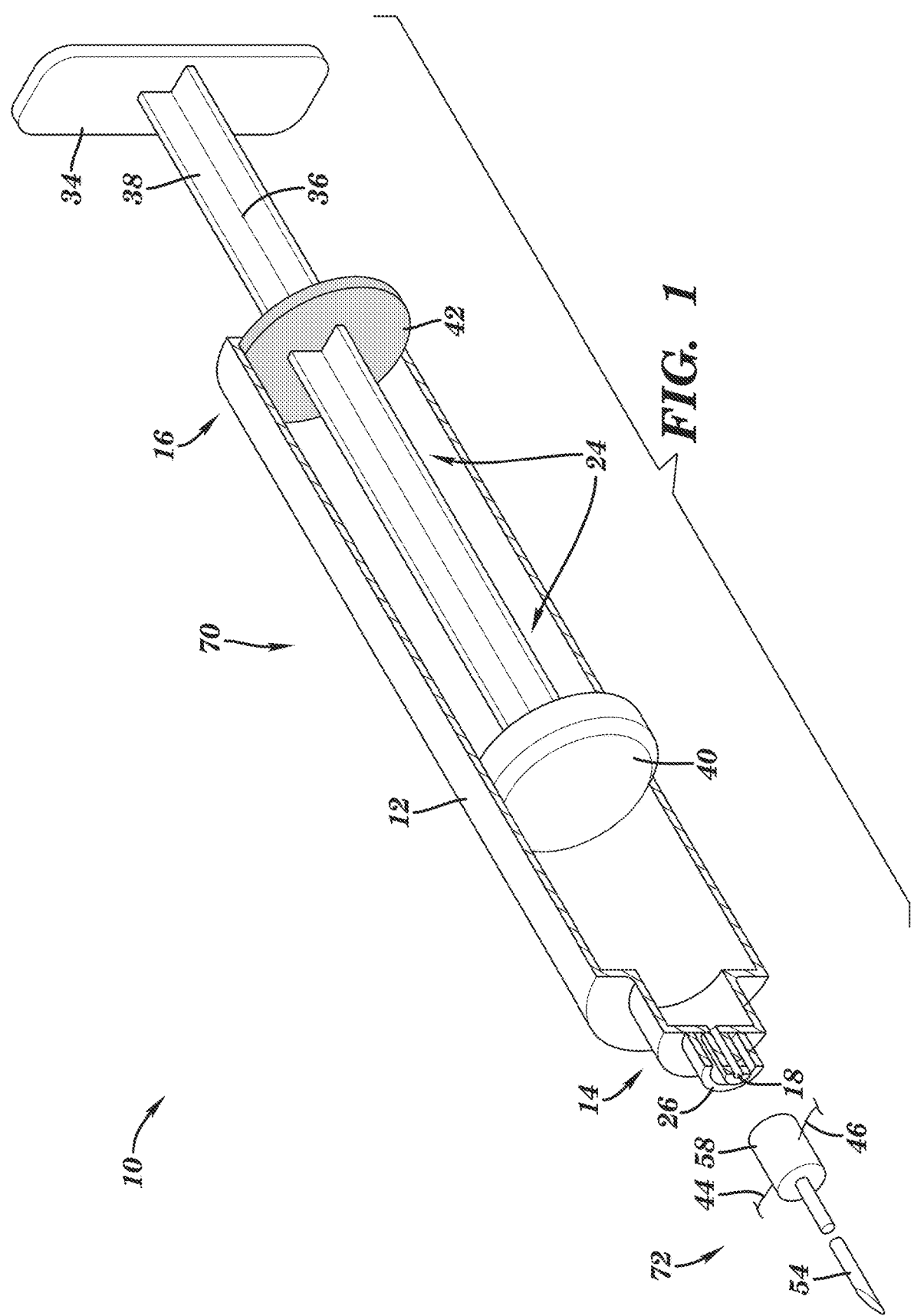
FIG. 1 is a perspective view of one embodiment of a system for collecting or extruding a cell-containing biological material of the present application, in the form of a syringe.

In one embodiment, the system of the present application has an extrusion/collection device in the form of a syringe or syringe-like device. Referring to FIG. 1, illustrated is system 10, which is a syringe and Luer type fitting (e.g., a Luer taper fitting) device (shown in a perspective view), which is adapted to include an electrical impedance spectroscopy device to monitor biologically relevant attributes of a cell-containing biological material as it enters or exits the syringe. System 10 includes extrusion/collection device (syringe) 70 having outer housing 12 with distal end 14 and proximal end 16. Outer housing 12 includes orifice 18 at or near distal end 14.

With further reference to FIG. 1, extrusion/collection device (syringe) 70 includes chamber 24, which is defined by outer housing 12. Chamber 24 has an interior volume in which it holds fluid that is meant to exit or enter orifice 18. Thus, orifice 18 is fluidically connected to collection chamber 24.

Extrusion/collection device 70 also includes plunger 34. Plunger 34 comprises an elongate rod 36. In one embodiment, elongate rod 36 comprises one or more longitudinally extending ribs 38. It will be understood that elongate rod 36 may include any number of ribs 38. In certain embodiments, elongate rod 36 comprises a plurality of longitudinally extending ribs 38. In one embodiment, elongate rod 36 includes 1, 2, 3, or 4 ribs. Ribs 38 may extend varying or the same radial distances relative to one another. In another embodiment, elongate rod 36 comprises no extending ribs, but has a smooth tubular structure.

Figure 2:
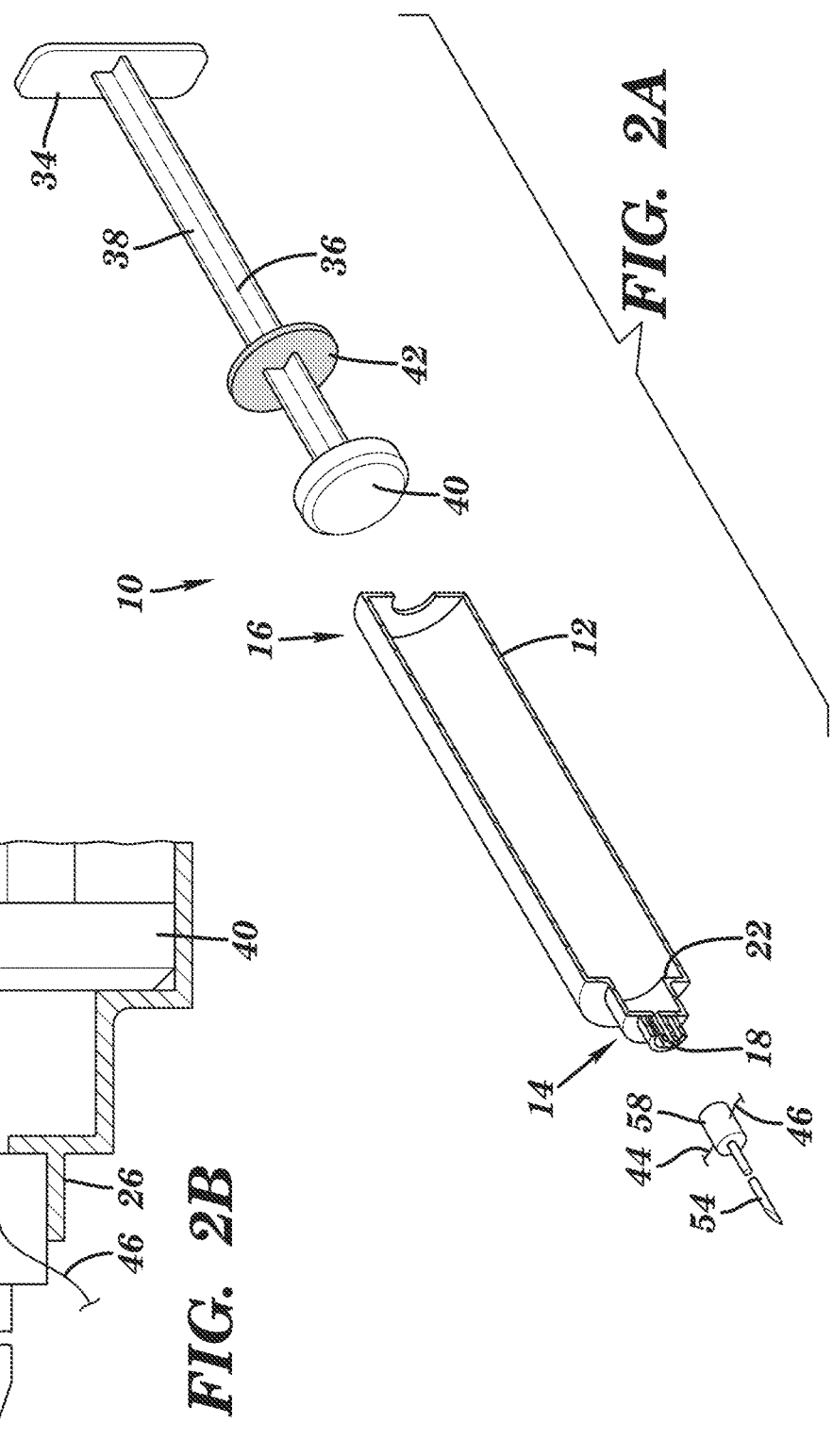
FIG. 2A is an exploded perspective view of one embodiment of a system for collecting or extruding a cell-containing biological material of the present application.
FIG. 2B is a partially exploded cross-sectional view of FIG. 2A.
Figure 3:
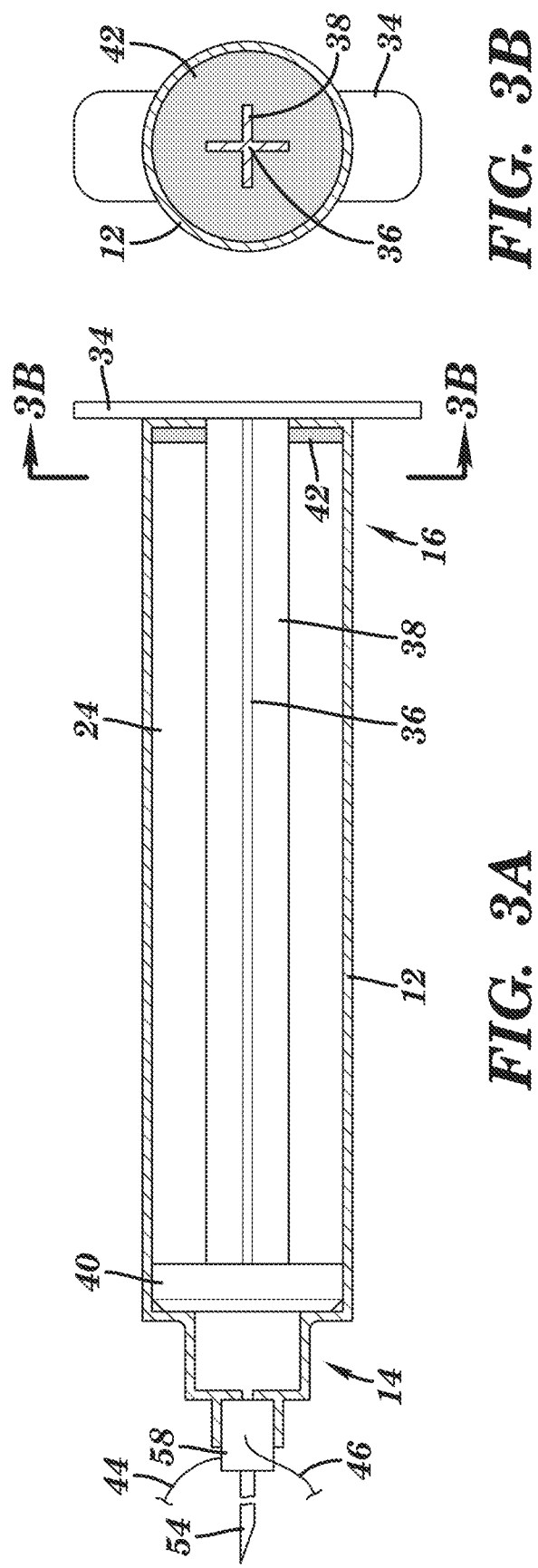
FIG. 3A is a side view of one embodiment of a system for collecting or extruding a cell-containing biological material of the present application.
FIG. 3B is a cross-sectional end view along line 3B-3B of FIG. 3A.

Elongate rod 36 also includes rod end 40. Rod end 40 is slidably and sealingly engaged with the interior diameter of collection chamber 24 or, when plunger 34 is in the advanced position, with distal end 14, as shown in FIG. 2B and FIG. 3A.

Plunger 34 is slidably and sealingly insertable into outer housing 12. In certain embodiments, first end cap 42 is mounted on ribs 38 and positioned interior to proximal end 16 such that first end cap 42 is engagable with the inner surfaces of outer housing 12, as shown in FIG. 1. First end cap 42 may be generally cylindrical and keyed to elongate rod 36 and one or more ribs 38, as shown in FIG. 1. In this embodiment, chamber 24 is defined between outer housing 12 and first end cap 42.

Plunger 34 is axially moveable or slidable within chamber 24 between an advanced position (shown in FIG. 3A) and a retracted position (shown in, for example, FIG. 1). With reference to FIG. 3A, in the advanced position, plunger rod end 40 is positioned at or near distal end 14. In operation, the advanced position is achieved by pushing or sliding plunger 34 and, in turn, rod end 40 axially toward distal end 14. This can be achieved by a user manually operating plunger 34 or can be achieved by automated mechanical or electromechanical means attached to and operating plunger 34. With reference to FIG. 1, in the retracted position, rod end 40 is positioned near or toward proximal end 16. In operation, the retracted position is achieved by pulling or sliding plunger 34 and, in turn, rod end 40 axially toward proximal end 16. This can be achieved by a user manually operating the system, or can also be achieved by automated mechanical or electromechanical means.

With reference to FIGS. 1, 2A-B, and 3A, system 10 may further comprise cannula 54 connected to inlet 18. As described herein, the term cannula may include needles as a type of cannula. As will be appreciated, cannula 54 may be directly fixed to outer housing 12 and/or inlet 18 by fitting 58 for receiving cannula 54. Fitting 58 may be, for example, a Luer connector. Luer connectors are well known in the art, and are a standardized system of small-scale fluid fittings used for creating leak-free connections between a male fitting and a mating female part on medical or laboratory instruments, including hypodermic syringe tips and needles or stopcocks and needles.

With further reference to FIG. 1, FIGS. 2A-B, and FIGS. 3A-B, system 10 includes EIS device 72, which includes fitting 58 and electrode wires 44 and 46, each of which is connected to an electrode positioned within an in-line channel in fitting 58 shown in more detail in FIGS. 5A-D. Electrode wires 44 and 46 are capable of carrying AC current to deliver to electrodes 60 and 62 positioned in fitting 58, as shown in FIG. 4, to create the necessary electrical environment for measuring electrical impedance.

Figure 4:
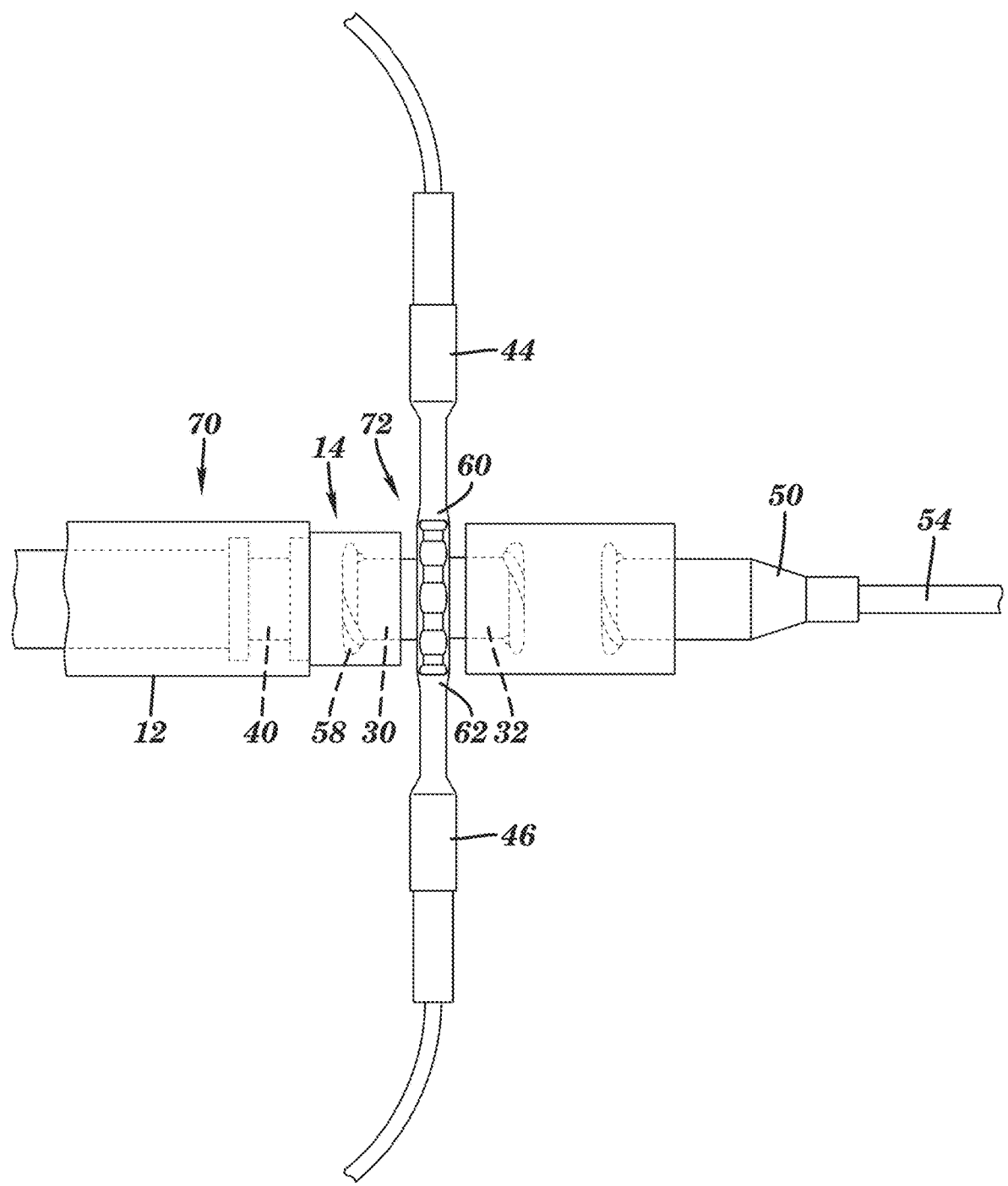
FIG. 4 is an enlarged view of one embodiment of an in-line EIS device of a system for collecting or extruding a cell-containing biological material of the present application placed in a standard syringe.

An enlarged view of an in-line EIS device in a Luer syringe fitting is illustrated in FIG. 4, which shows a portion of extrusion/collection device (syringe) 70 combined with EIS device 72. With further reference to FIG. 4, Luer fitting 58 is positioned on distal end 14 of extrusion/collection device (syringe) 70. Fitting 58 includes first end 30, which connects to distal end 14 via a screw-type fit, and second end 32 connects to a cannula adapter 50, which connects to cannula 54. Electrical wires 44 and 46 lead to electrodes 60 and 62 embedded inside of fitting 58 to create an electrical field through which fluid may be monitored.

Thus, another aspect of the present application is directed to a system for collecting or extruding a cell-containing biological material. This system includes a syringe device comprising a housing having opposed distal and proximal ends, where the distal end is provided with an orifice; a fitting connected at the orifice for interchangeably connecting a needle; a plunger axially movable within the housing between an advanced position near the distal end and a retracted position near the proximal end; an elongate rod being connected to said plunger to move said plunger axially between the advanced and retracted positions, and extending through the proximal end of the housing; and an electrical impedance spectroscopy (EIS) device operably connected to the syringe device at the fitting, where the EIS device comprises anti-parallel electrodes positioned in the fitting to create an electrical field for detecting impedance of a cell-containing biological material as it is extruded from or collected into the syringe device.

Figure 5A:
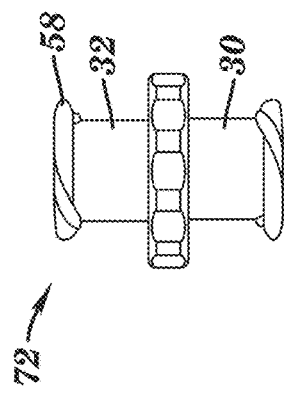
FIGS. 5A-D are various illustrated views of an EIS device built into a standard Luer type fitting for a syringe.
Figure 5B:
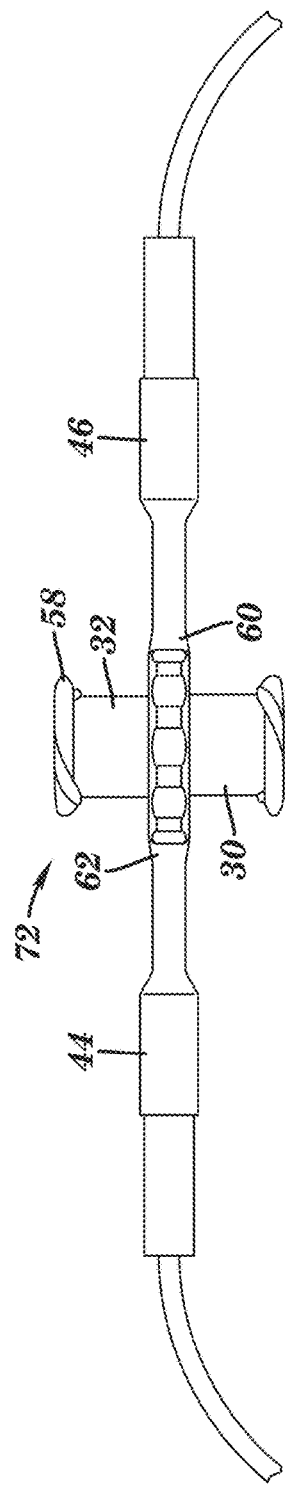
Figure 5C:
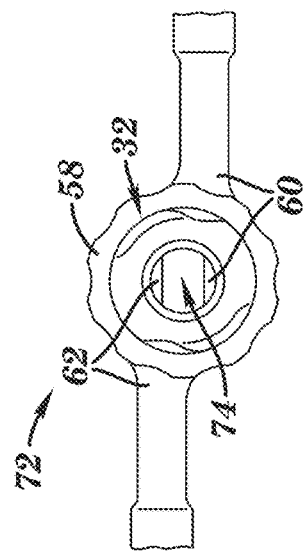

EIS device 72 of FIG. 4 is shown in more detail in FIGS. 5A-D. In the embodiments illustrated, EIS device 72 is an in-line impedance spectrometer that is capable of monitoring biologically relevant attributes of a cell-containing biological material as it is collected or extruded from collection/extrusion device 70. In general, in the embodiments illustrated, EIS device 72 is syringe fitting 58 equipped with two electrodes 60 and 62, connected to electrical wires 44 and 46, which are capable of creating an electrical field in the application of current. FIG. 5A is a side view of a standard Luer fitting before it has been equipped with electrodes to form an EIS device. Fitting 58 includes a first end 30, which connects to distal end 14, and second end 32, which connects to cannula fitting 50 (see FIG. 4). In FIG. 5B, fitting 58 from FIG. 5A is shown with two electrodes 60 and 62, positioned in an anti-parallel configuration in fitting 58 and connected to electrical wires 44 and 46. FIG. 5C is a top view of EIS device 72, which shows passage 74, through which biological fluid may flow. As illustrated, electrodes 60 and 62 are positioned on either side of passage 74, in an anti-parallel configuration, to create an electrical field in which changes in impedance can be measured as biological fluid travels through passage 74.

Figure 5D:
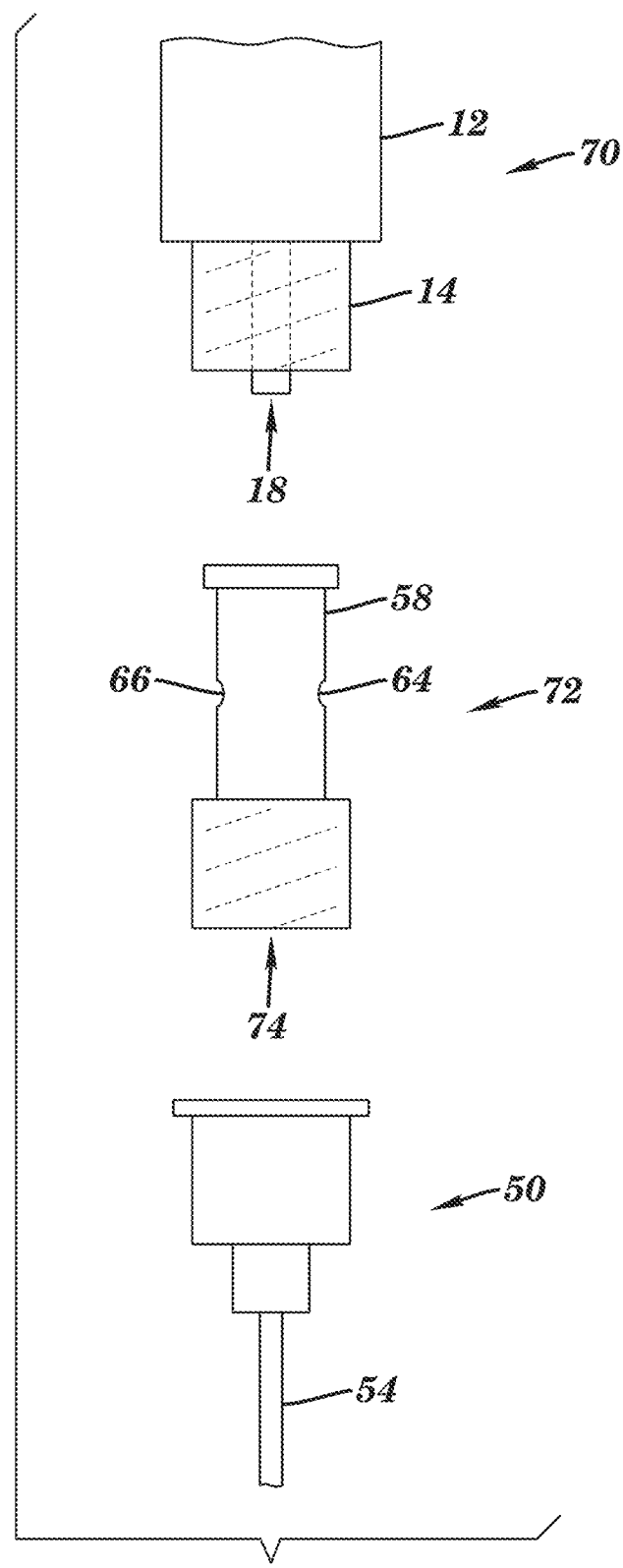

FIG. 5D is an exploded view showing adaptations made to fitting 58 to incorporate electrodes 60 and 62 in passage 74. Specifically, holes 64 and 66 are drilled into fitting 58 to create ports into which electrodes 60 and 62 may be positioned. In one embodiment, electrodes 60 and 62 are positioned in passage 74 of fitting 58 in an anti-parallel configuration. In one embodiment, electrodes 60 and 62 are anti-parallel, gold-plated probes capable of generating an electrical field for interrogating a volume prior to exiting extrusion/collection device (syringe) 70 and upon entering a syringe needle 54.

The anti-parallel orientation of electrodes 60 and 62 makes for easier manufacturing and reduces parasitic effects (e.g., inductances) in the measurements, but that orientation is not critical to device function, and other orientations may also be used. Whatever orientation the electrodes of an EIS device take, they must create an environment in which the electrical field generated by the electrodes can permeate a cell-containing biological material sample.

While FIGS. 1-5 illustrate a extrusion/collection device in the form of a syringe, other forms of an extrusion/collection device may employ an EIS device as described in the present application. Basic principles of electrical impedance spectroscopy may be observed in a variety of mechanical designs, any of which may be suitable for monitoring biologically relevant attributes of a cell-containing biological material as it is extruded from or collected into an extrusion/collection device. It should be appreciated that certain electrode configurations may confer certain advantages. Electrodes may take various designs, and throughout development of the present application, various designs have been envisioned, including interdigitated electrodes, an open-ended coaxial probe, coaxial electrodes, parallel plate electrodes, and anti-parallel pin electrodes. The fundamental requirement of a suitable EIS device for the system of the present application is that the electric fields generated by the electrodes permeate a cell-containing sample. Beyond that, numerous design configurations may be contemplated. Thus, alternative versions of the EIS device may include variations on the electrode geometry/configuration (e.g., parallel plates, coaxial cylinders), the electrode position (e.g., within the syringe barrel, integrated within the needle), or the electrode housing material and configuration (e.g., nylon; cubic or spherical chambers). Whatever the specific structure, the electrodes should be configured to provide an electrical field sufficient to enable the detection of analytes within a suspending liquid or gel based on changes in impedance.

Various non-limiting embodiments of other electrode configurations that may be employed for an EIS device for an extrusion/collection device are illustrated in FIGS. 6-9, which are now discussed.

Figure 6:
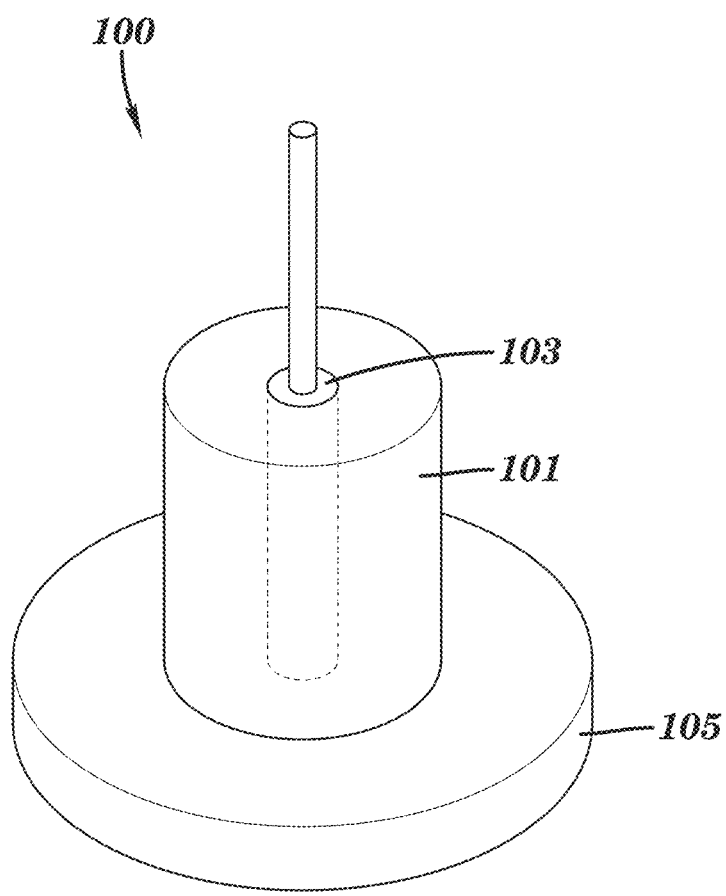
FIG. 6 is a perspective view of one embodiment of a coaxial probe testbed for EIS measurement.

FIG. 6 depicts coaxial probe testbed 100. Field lines travel radially between outer conductive shell 101 and inner conductive core 103, modified by their passage through a sample. The direction of field propagation in this and other embodiments is not important to functionality and in fact changes many times per second under an alternating current. Probe testbed 101 resides on acrylic base 105.

Figure 7A:
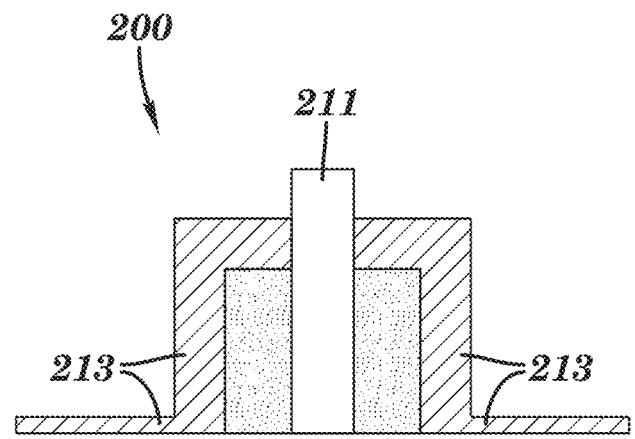
FIGS. 7A-B illustrate a side view (FIG. 7A) and a top view (FIG. 7B) of one embodiment of an open-ended probe design of an EIS device of the present application.
Figure 7B:
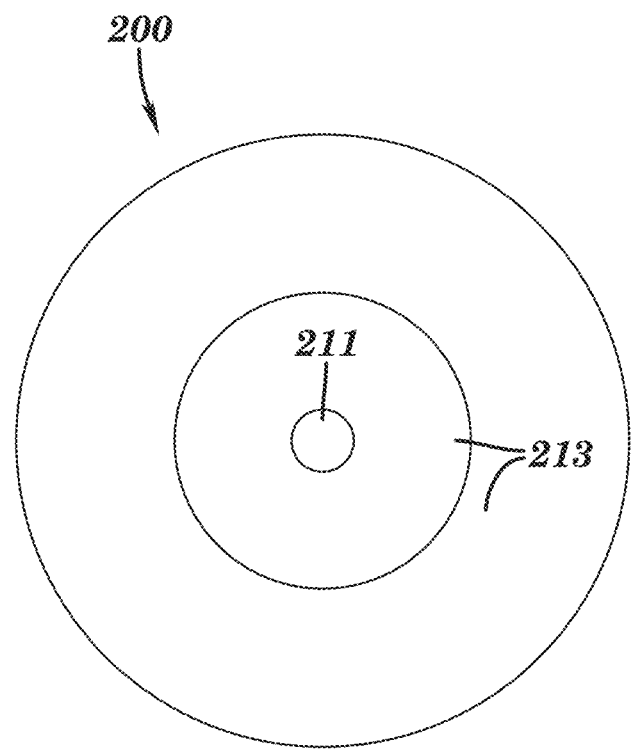

FIGS. 7A-B illustrate an embodiment disclosed in Filali et al., "Design and Calibration of a Large Open-Ended Coaxial Probe for the Measurement of the Dielectric Properties of Concrete," *IEEE Transactions on Microwave Theory and Techniques,* 56 (10): 2322-2328 (2008), which is hereby incorporated by reference in its entirety. This open-ended probe design 200 is similar to the coaxial electrodes depicted in FIG. 6, but in this case the field lines arc between inner conductive core 211 and conductive flanges 213, passing through a portion of the sample in the process. This particular embodiment would be useful not as an inline impedance spectrometer, but as a spectrometer that could detect impedance by, e.g., lowering the device into the surface of a fluid.

Figures 8A, 8B:
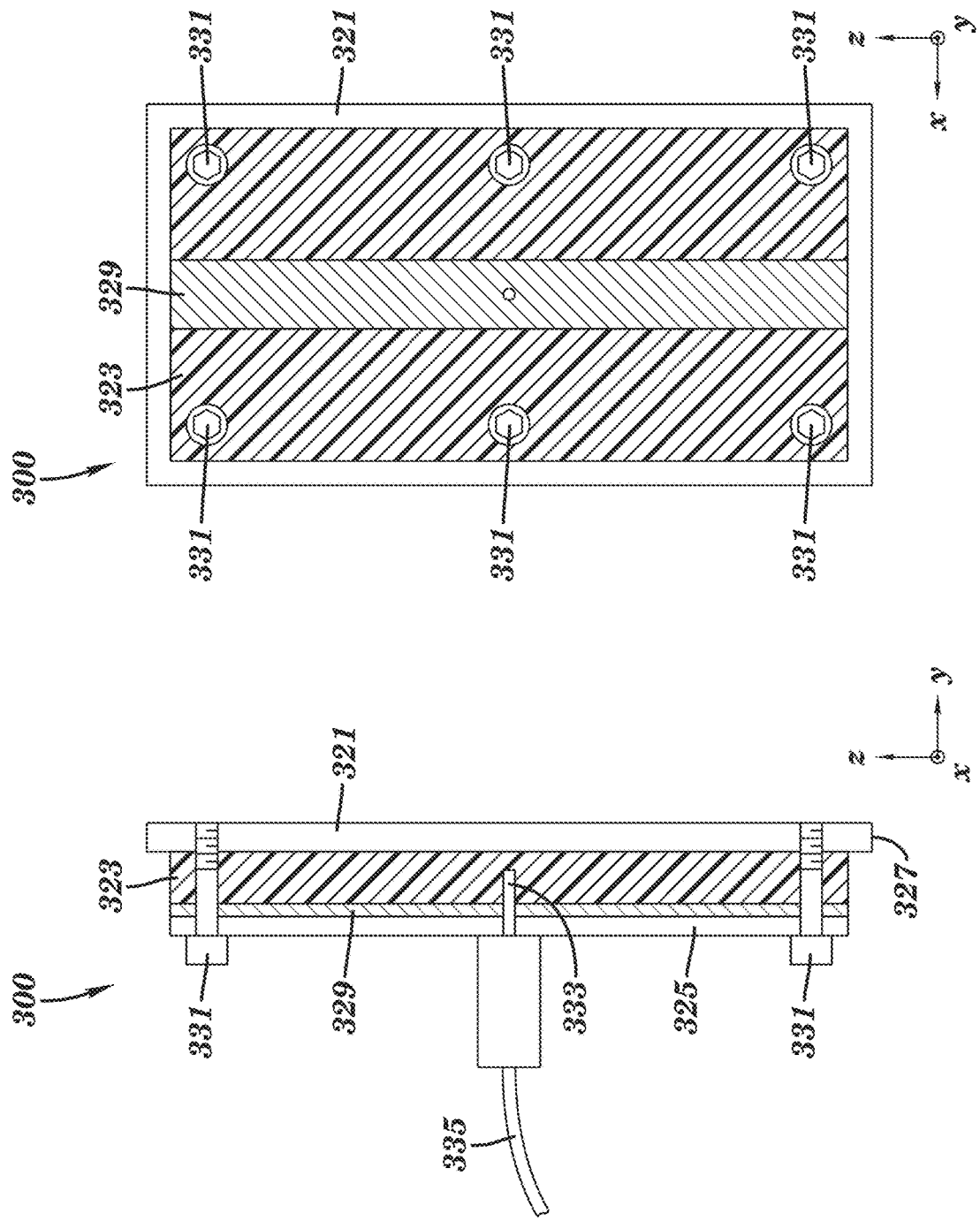
FIGS. 8A-C illustrate one embodiment of an EIS device comprising a parallel plate electrode system.
Figure 8C:
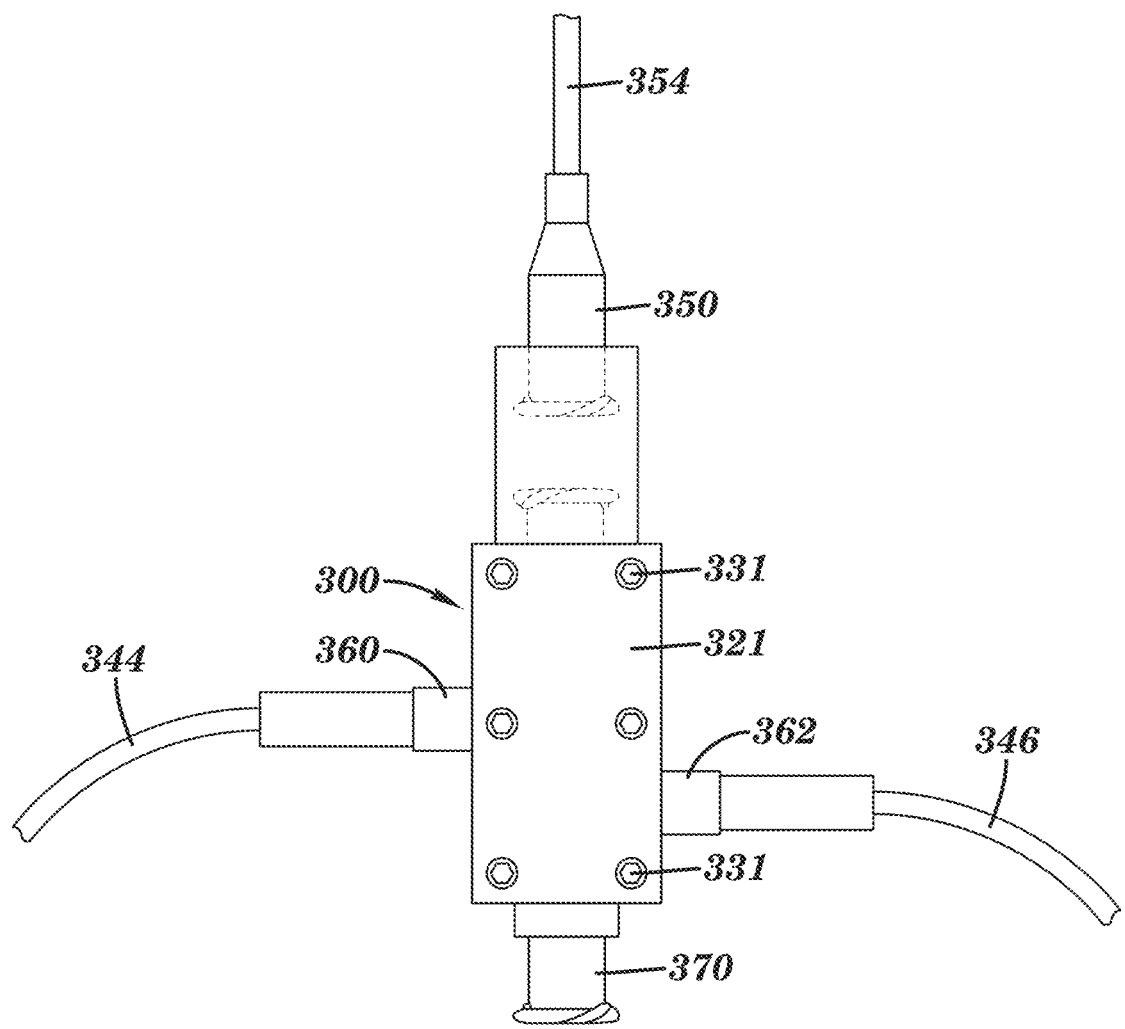

FIGS. 8A-B illustrate an embodiment of EIS device 300 comprising a parallel plate electrode system, as an alternative to an antiparallel probe system. The field lines propagate between two plates 321 just as they do between the probes shown in, e.g., FIG. 5C. EIS device 300 has laser cut acrylic 323 with back plate 325, manifold 327, and conductive plate 329. Two devices 300 are held together, face-to-face, by fasteners 331. An electrode 333 is positioned into the acrylic 323, and is connected to cable 335. EIS device 300 positioned between syringe 370 and cannula 354 is illustrated in FIG. 8C. Specifically, FIG. 8C shows a parallel plate prototype mounted in a syringe assembly. Non-conducting back plate 321 of one of the two plates is illustrated. As shown in FIG. 8C, EIS device 300 has electrodes 360 and 362 connected to electrical wires 344 and 346, which create an electrical field. A sample passes through the space between the two plates 321 and measurably disrupts the field. The rectangular prismatic-shaped parallel plate device shown in FIG. 8A (side view) and 8B (top down view) has a nonconductive back plate 325, and one of electrodes 333 is seen in FIG. 8A. This combined back plate-electrode wafer is attached at 360 to electrical wire 344. The top plate 321 directly faces another plate (not visible) on the other side of laser cut acrylic 323 through which investigated material flows, and both plates may be in contact with rubber gaskets that seal the interfaces between the laser cut acrylic and the back plates. Wire 346 (FIG. 8C) connects at electrode 362 to a lower plate (not shown because it is directly underneath back plate 321, and syringe-compatible ports which allow for the flow of material extend in North and South directions (toward cannula 354) or extrusion/collection device (syringe) 370, as pictured. Nylon nuts (not pictured) and fasteners 331 that pass through the walls of the channel maintain the device's integrity. The parallel plate system (as with all local electrode arrangements with a voltage difference) forms a capacitor. As with other impedance spectroscopy approaches, materials in the space between the electrodes attenuate the electric field in that region, and the nature of the disruption, as measured by the electrical impedance of a circuit incorporating the measurement device, reveals information about microscopic properties of the material. The biological properties can be interrogated through use of dielectric relaxation models such as the Cole-Cole equation.

Figure 9:
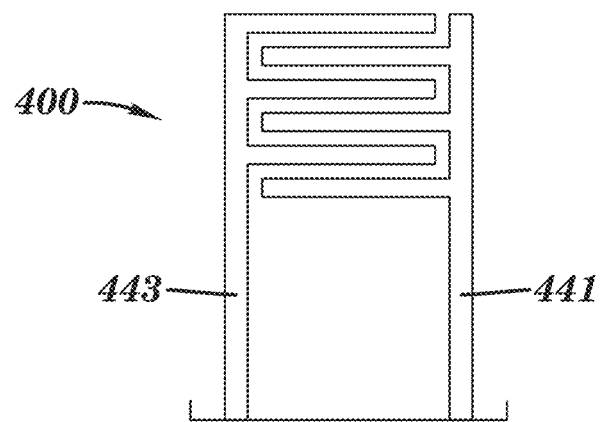
FIG. 9 is an illustration of one embodiment of an EIS device with interdigitated electrodes.

FIG. 9 is an illustration of yet another embodiment of electrode formation for an EIS device that could be employed with an extrusion/collection device, where the electrodes have an interdigitated structure. Interdigitated electrodes 441 and 443 of EIS device 400 are an especially common arrangement of electrodes in microfluidics or for the detection of cultures over long periods of time (see Varshney & Li, "Interdigitated Array Microelectrode Based Impedance Biosensor Coupled with Magnetic Nanoparticle-antibody Conjugates for Detection of *Escherichia coli* O157:H7 in Food Samples," *Biosens. Biolectron.* 22 (11): 2408-14 (2007); Reitinger et al., "Electrical Impedance Sensing in Cell-substrates for Rapid and Selective Multipotential Differentiation Capacity Monitoring of Human Mesenchymal Stem Cells," *Biosens. Bioelectron.* 34 (1): 63-9 (2012), which are hereby incorporated by reference in their entirety).

Figure 10:
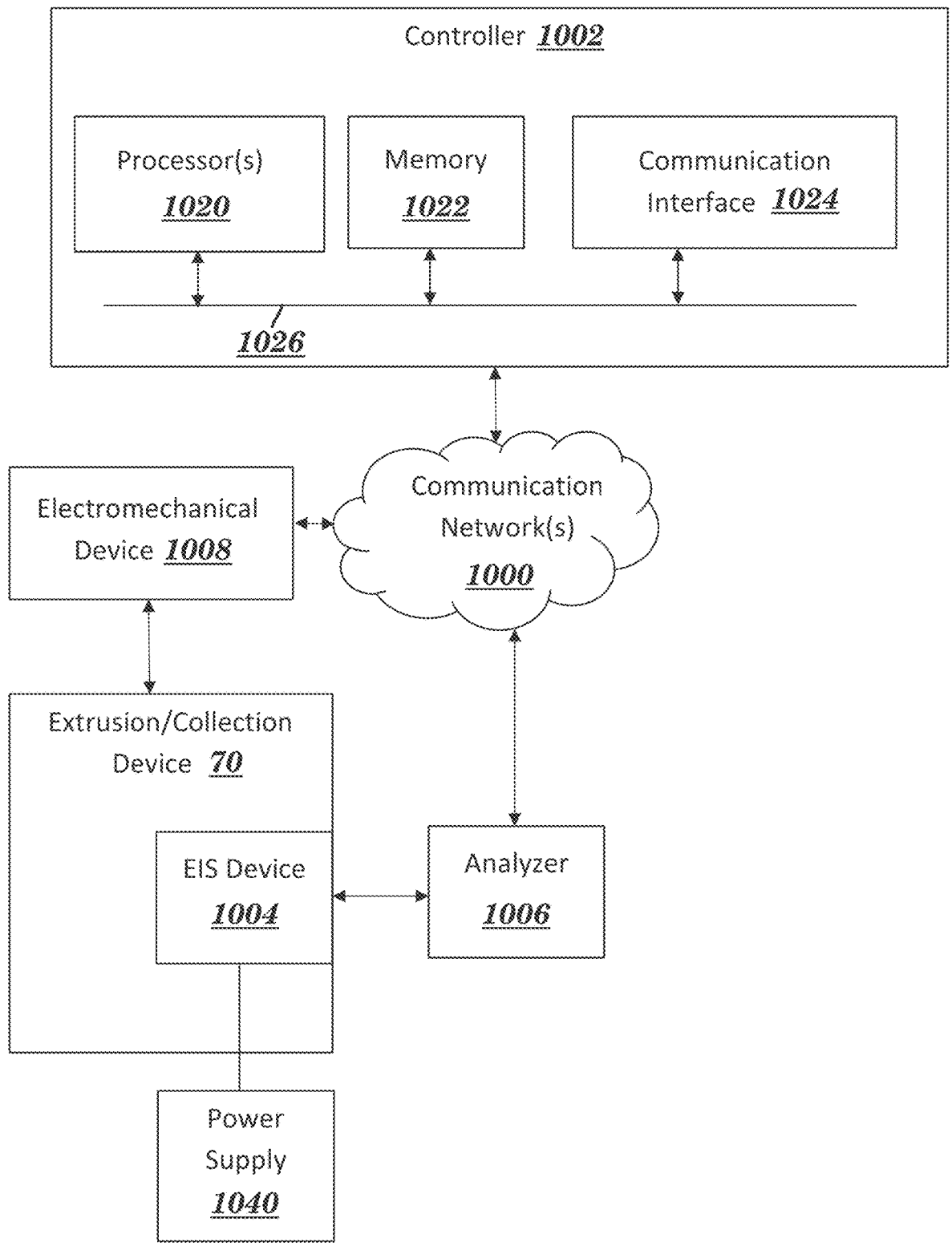
FIG. 10 is a block diagram of an environment including a controller coupled to an EIS device.

Operation of the system of the present application is controlled by a system controller operably connected to at least the EIS device of the system and, in some embodiments, the extrusion collection device of the system to control collection and/or extrusion through an orifice. FIG. 10 illustrates environment 1000 including controller 1002 coupled to EIS device 1004, which is part of extrusion/collection device (syringe) 70, for example, through analyzer 1006. Controller 1002 is also coupled to electromechanical device 1008 to provide a feedback loop. Electromechanical device 1008 is configured to control operation of extrusion/collection device (syringe) 70 including the depositing or collecting of biological material, based on measurements of impedance from data received from EIS device 1004. EIS device 1004 may have any of the configurations described above. EIS device 1004 is also connected to power supply 1040, which may be external as illustrated, or alternatively may be part of extrusion/collection device (syringe) 70.

In this example, controller 1002 includes one or more processor(s) 1020, memory 1022, and communication interface 1024 that are coupled together by bus 1026 or other communication link, although controller 1002 can include other types and/or numbers of elements in other configurations.

In this example, processor(s) 1020 of controller 1002 may execute programmed instructions stored in memory 1022 for any number of the functions or other operations illustrated and described by way of the examples herein, including determining impedance measurements based on signals received from EIS device 1004, or to provide one or more instructions to electromechanical device 1008 to adjust an operation of extrusion/collection device (syringe) 70. Processor(s) 1020 of controller 1002 may include one or more CPUs, GPUs, or general processors with one or more processing cores, for example, although other types of processor(s) can be used.

Memory 1022 of controller 1002 stores the programmed instructions for one or more aspects of the present technology as illustrated and described herein, although some or all of the programmed instructions could be stored elsewhere. A variety of different types of memory storage devices, such as random access memory (RAM), read only memory (ROM), hard disk drive (HDD), solid state drives (SSD), flash memory, or other computer readable medium that is read from and written to by a magnetic, optical, or other reading and writing system that is coupled to processor(s) 1020 can be used for memory 1022.

Accordingly, memory 1022 of controller 1002 can store application(s) that can include executable instructions that, when executed by controller 1002, cause controller 1002 to perform actions, such as determining impedance measurements based on data received from EIS device 1004, or to provide instructions to electromechanical device 1006 to adjust one or more operations of extrusion/collection device (syringe) 70, described by way of the examples herein, based on the obtained measurements. For example, the adjustment may adjust the rate or amount of material extruded or collected. In other embodiments, the instructions may be to vary the flow rate of a cell-containing biological material from or into the extrusion/collection device, varying the quantity of cells in the cell-containing biological material being extruded from or collected into the extrusion/collection device, varying the pressure of the cell-containing biological material as it is extruded from or collected into the extrusion/collection device, and combinations thereof. For example, memory 1022 can store impedance analyzer 1028 such as the program Waveforms manufactured by Diligent, Inc., Seattle, WA, that is configured to analyze impedance data from EIS device 1004. The application(s) can be implemented as modules or components of other application(s). Further, the application(s) can be implemented as operating system extensions, modules, plugins, or the like.

Communication interface 1024 of controller 1002 operatively couples and communicates between controller 1002, analyzer 1006, and electromechanical device 1008, which are all coupled together by one or more communication network(s), although other types and/or numbers of connections and/or configurations to other devices and/or elements can be used. By way of example only, the communication network(s) can include local area network(s) (LAN(s)) or wide area network(s) (WAN(s)), and/or wireless networks, although other types and/or number of protocols and/or communication network(s) can be used.

Although controller 1002 is illustrated and described in the illustrative examples herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

Portions of all of the examples of the technology illustrated and described herein may also be embodied as one or more non-transitory computer readable media having instructions stored thereon for one or more aspects of the present technology. The instructions in some examples include executable code that when executed by processor 1022 of controller 1002, cause processor 1020 to carry out steps necessary to implement the methods of the examples of this technology that are illustrated and described herein.

In this embodiment, controller 1002 receives data from analyzer 1006 which is a device configured to receive and analyze analog signals from the electrodes of EIS device 1004. Analyzer 1004 is configured to analyze the analog signals and provide digital data to controller 1002 for further processing. For example, analyzer 1006 could be the Analog Discovery 2 Module manufactured by Digilent Inc., Seattle, WA, although other devices could be employed. Analyzer 1006 can be coupled to EIS device 1004 using a BNC adapter, by way of example. In some embodiments, the extrusion/collection device of the system of the present application is an extrusion device. Suitable extrusion devices include, without limitation, syringe or syringe-like devices, such as those described above, and others, such as those described in U.S. Pat. Nos. 7,939,003; 8,636,938; 8,877,112; and 9,242,031, which are hereby incorporated by reference in their entirety. In other words, in the system of the present application, extrusion devices may include a wide array of devices suitable for depositing material to fabricate structures using materials comprising living cells, including material deposition tools described in U.S. Pat. Nos. 7,939,003; 8,636,938; 8,877,112; and 9,242,031, which are hereby incorporated by reference in their entirety. A basic structure of a suitable extrusion device is a device comprising some type of collection chamber, or holding chamber where a small to a large amount of material comprising living cells may be stored, and an orifice for extruding the material comprising living cells.

Accordingly, another aspect of the present application relates to a method of depositing a cell-containing biological material. This method involves providing a device as described herein; extruding from the device a cell-containing biological material; and monitoring biologically relevant attributes of the cell-containing biological material as it is extruded from the device.

The system and methods of the present application may be used in methods of fabricating an article and methods of fabricating a living three-dimensional structure, where that method involves, e.g., extruding cell-containing biological material from an extrusion device. General methods of fabricating a living three-dimensional structure are described herein, and may involve the system and methods also described in U.S. Pat. Nos. 7,939,003; 8,636,938; 8,877,112; and 9,242,031, which are hereby incorporated by reference in their entirety. The advantage of the system of the present application is that it has the ability to monitor biologically relevant attributes of a cell-containing biological material as it is extruded from the extrusion device, as well as adjusting the rate/amount of extruded material based on the monitored biologically relevant attributes.

Cell-containing biological materials that may be used with the system and methods of the present application include, without limitation, any material capable of being deposited from a material deposition tool onto a substrate. The type of material will depend on the type of material deposition tool (or extrusion device) being employed. For example, when a syringe-like device is employed, suitable materials include, without limitation, virtually any liquid, slurry, or gel.

In some embodiments, the cell-containing biological material is a hydrogel having seeded cells. Suitable hydrogels include, without limitation, alginate, agarose, collagen, chitosan, fibrin, hyaluronic acid, carrageenan, polyethylene oxide, polypropylene oxide, polyethylene oxide-co-polypropylene oxide, hydroxypropyl methyl cellulose, poly(propylene fumarate-co-ethylene glycol), poly(ethylene glycol)-co-poly(lactic acid), poly(vinyl alcohol), KDL12 oligopeptides, and poly(n-isopropyl acrylamide).

Hydrogels may have a controlled rate of crosslinking through the adjustment of environmental variables including, but not limited to, temperature, pH, ionic strength, heat, light, or the addition of chemical crosslinking agents such as calcium, magnesium, barium, chondroitin, sulfate, and thrombin. A cross-linking compound may be provided in a weight ratio of hydrogel to cross-linking compound of about 1:100 to 100:1, respectively. In some embodiments, the weight ratio of cross-linking compound to hydrogel is about 1:5.3. In some embodiments, the cross-linking compound is calcium sulfate.

In one embodiment, cells in a hydrogel are of a single cell type. Suitable cell types include, without limitation, all mammalian or plant cells. Specific cell types may include, without limitation, chondrocytes, osteoblasts, osteoclasts, osteocytes, fibroblasts, hepatocytes, skeletal myoblasts, cardiac myocytes, epithelial cells, endothelial cells, keratinocytes, neurons, Schwann cells, oligodendrocytes, astrocytes, pneumocytes, adipocytes, smooth muscle cells, T cells, B cells, marrow-derived stem cells, hematopoetic stem cells, osteoprogenitor cells, neural stem cells, and embryonic stem cells. Alternatively, cells in the hydrogel may be of more than one cell type.

Dispensing material from an extrusion device may be carried out under sterile conditions including, for example, in a hermetically sealed envelope or container.

In other embodiments of a system and method involving an extrusion device, the system and/or method of the present application may be used in administering to a subject a cell-containing biological material for which monitoring biologically relevant attributes of the cell-containing biological material is desirable. For example, in cell therapy, cell transplantation, cytotherapy, and other therapies that involve the administration of living cells to a patient, it would be desirable to monitor the attributes of the cell-containing biological material as it is being administered from an extrusion device (e.g., a syringe). Using the system of the present application, one could monitor the quantity, quality, and even type of cells being injected, grafted, or implanted into a subject to effect a medicinal effect. Further, the rate/amount of deposited material can be adjusted based on the monitoring.

In some embodiments, the extrusion/collection device of the system of the present application is a collection device. Suitable collection devices include, without limitation, syringe or syringe-like devices, such as those described above, or any other suitable device capable of collecting biological fluids into a holding container where it would desirable to monitor biologically relevant attributes of a cell-containing biological material as it is collected into the collection device.

Thus, a further aspect relates to a method of collecting a cell-containing biological material. This method involves providing a device as described herein; collecting into the device a cell-containing biological material; and monitoring biologically relevant attributes of the cell-containing biological material as it is collected into the device.

Collection using the system and methods of the present application may occur in a laboratory or in vitro setting where monitoring of fluids collected from containers or other laboratory equipment is desirable. In some embodiments, the system and methods of the present application may involve collecting cell-containing biological material directly from subjects. Regardless, if it is important or desirable to monitor biologically relevant attributes of the cell-containing biological material being collected, the system and methods of the present application, which incorporate an EIS device, is able to provide information relating to the biologically relevant attributes of the cell-containing biological material. In certain embodiments, the system also adjusts the collection based on the obtained information.

The systems and methods of the present application involve monitoring biologically relevant attributes of a cell-containing biological material being extruded from or collected into the extrusion/collection device. As used herein, biologically relevant attributes of a cell-containing biological material, which may be monitored with the EIS device described herein, include, without limitation cell viability, cell count, cell type, cell purity, and combinations thereof. Cell viability is a measure of living or intact cells in the biological material (i.e., un-lysed cells); cell count includes a measure of the number of cells in a biological material, the total number of cells extruded out of or into a collection device, or the rate of cell deposition or intake over a period of time; cell type is a measure of cell type, e.g., bacterial cells versus eukaryotic or mammalian cells; and cell purity is a measure of the purity of a cell-containing solution by determining the presence or absence of other contaminants in a solution, or different types of cells in a solution, e.g., if it is desirable to have a solution with a single cell type. For example, the system and methods of the present application may involve 3D bioprinter quality monitoring, injectable drug delivery quality assurance, or chemical or biological contamination detection in laboratory or research settings. Noninvasive, nontoxic, and nondestructive real-time monitoring of biologically active materials is a largely unmet challenge in biomedical engineering. Nondestructive means of assessment of critical quality attributes of these materials is especially of interest; the time and/or cost associated with generating biological samples such as tissue constructs is at odds with the currently widespread destructive biochemical analysis of such materials, and hinders research in this area. Further, regulatory concerns exist in gathering data from sacrificial samples as a proxy for measurements taken directly from patient-bound materials. To address these concerns, the monitoring approach described herein is nondestructive to biological materials given sufficient calibration and is integrated within the material delivery or collection environment, e.g., a syringe or syringe-compatible channel.

A further aspect of the present application is directed to an electrical impedance spectroscopy (EIS) device connectable to an extrusion/collection device, where the EIS device comprises anti-parallel electrodes configured to create an electrical field around a fluid passageway for detecting impedance of a cell-containing biological material as it moves through the passageway.

EXAMPLES

Example 1—Feasibility of a Low-cost Electrical Impedance Spectrometer for Investigating Cell-saline Suspensions Introduction The goal of this work was an assessment of the feasibility of a low-cost impedance spectrometer for the determination of cell concentration in saline suspensions. This work serves as a proof-of-concept for integrating EIS techniques in a bioprinter environment by measuring impedance as both a function of suspended cell concentration and applied frequency when compared to saline alone.

A basic set of in-house electrodes were combined with an impedance analyzer to confirm the soundness of EIS as a cell detection approach with readily available and affordable laboratory materials. Following the successful delineation of various cell concentrations via EIS techniques, investigating EIS within a bioprinter environment became the primary focus. To that end, a syringe-based impedance analyzer capable of interfacing with the already fabricated coaxial probes was created, and its detection capabilities were assessed in the same fashion as the coaxial probes.

Measurement Platform

Figure 11:
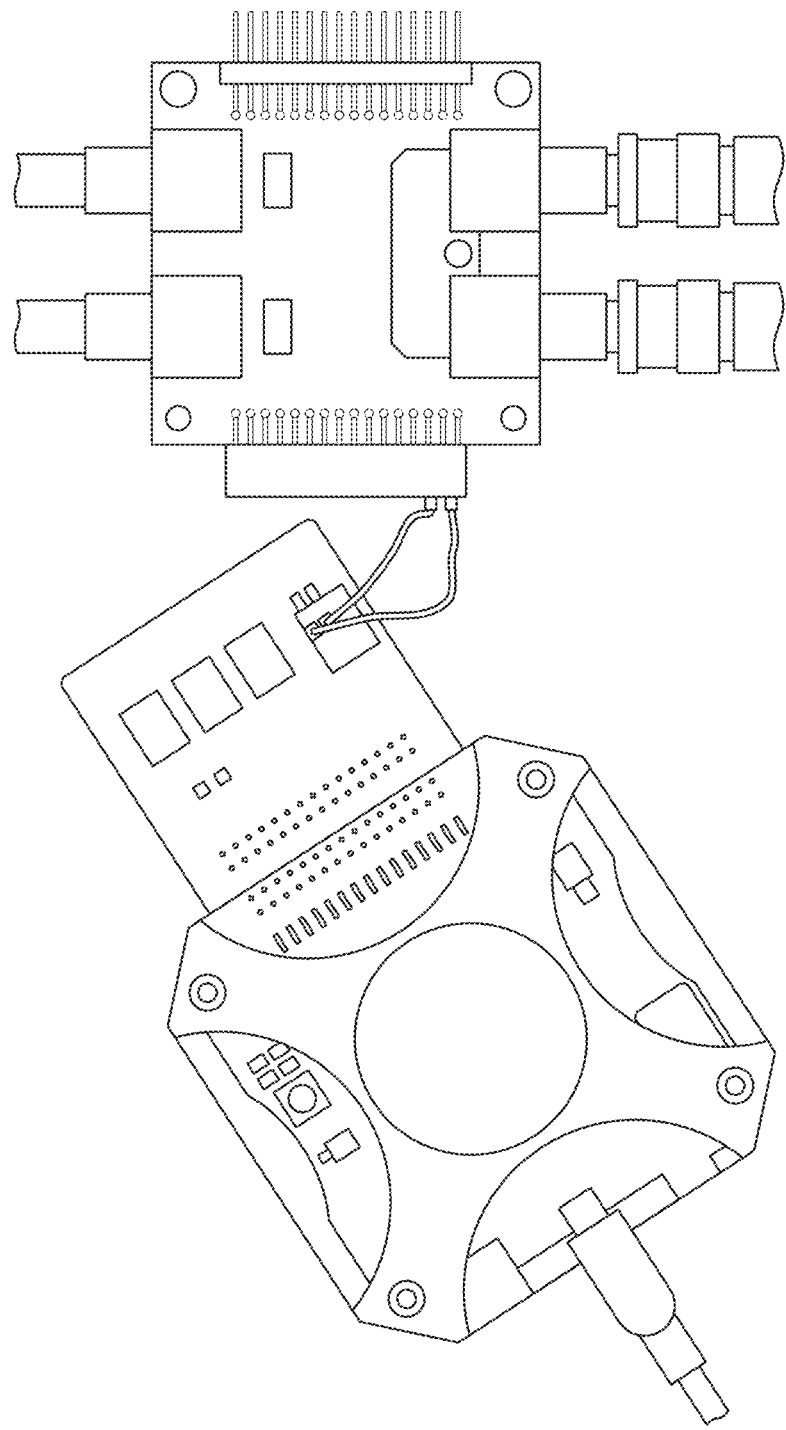
FIG. 11 is an illustration of an analog discovery impedance analyzer system. The system includes an analog discovery module (bottom), impedance analyzer board (middle, with orange tabs), and BNC adapter (top). Bottom cable leads to a personal computer.

An Analog Discovery 2, BNC adapter, and impedance analyzer (Digilent Inc., Seattle, WA) were assembled into the measurement system that formed the backend for all experiments (FIG. 11). The program WaveForms (3.10.9, Digilent Inc.) served as a user interface, and the Analog Discovery module connected to a personal computer running WaveForms via the supplied USB cable.

Coaxial Probe Fabrication

Figure 12C:
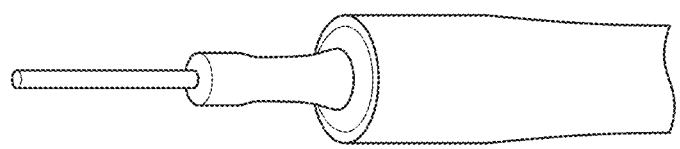
FIG. 12C is an illustration showing the final coaxial electrode after heatshrink tubing and heat were applied. Note the two sizes of tubing used; one insulates the solder weld and the other encloses the tape/wax.
Figure 12B:
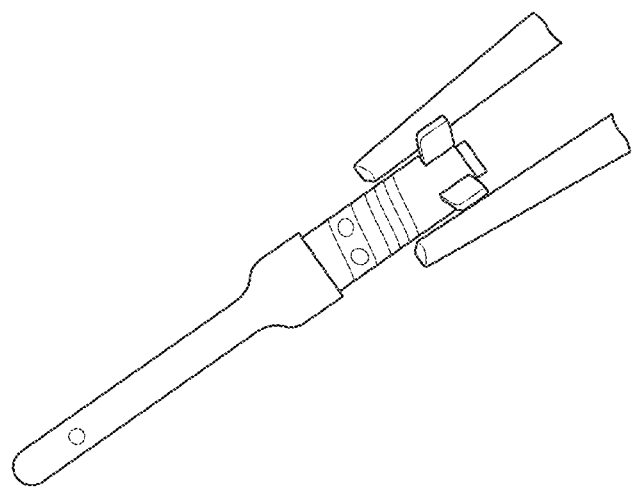
FIG. 12B is a close-up illustration of a VGA pin prior to soldering. The length of exposed conductor (FIG. 12A) fits in the open region between the forceps, and solder was then applied.
Figure 12A:
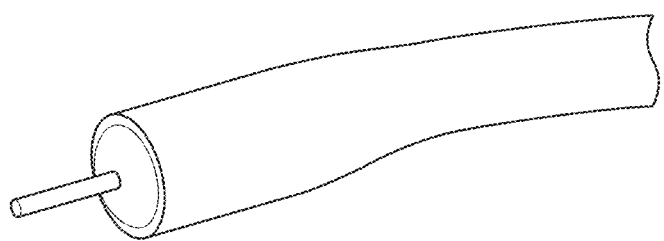
FIG. 12A is an illustration of a copper core of coaxial cable exposed after having been cut and stripped. Wax film covers the cross-section of the cable to waterproof, and a thin layer of tape holds the wax in place.

Electrical probes were fabricated in-house by cutting a standard 6' BNC cable in half, stripping the insulating material surrounding the conducting core back about 1 cm away from the termination of the core, wrapping the exposed cross-section in wax film and electrical tape to waterproof, soldering gold-plated video graphics array ("VGA") pins to the exposed length of innerconductor, surrounding the entire region (other than probe surface) in heat-shrink tubing, and applying heat (FIGS. 12A-C). These coaxial probes served as a testbed for gathering preliminary data and as an interface to a syringe-based spectrometer.

Coaxial Probe/Analog Discovery Assessment

Figure 13B:
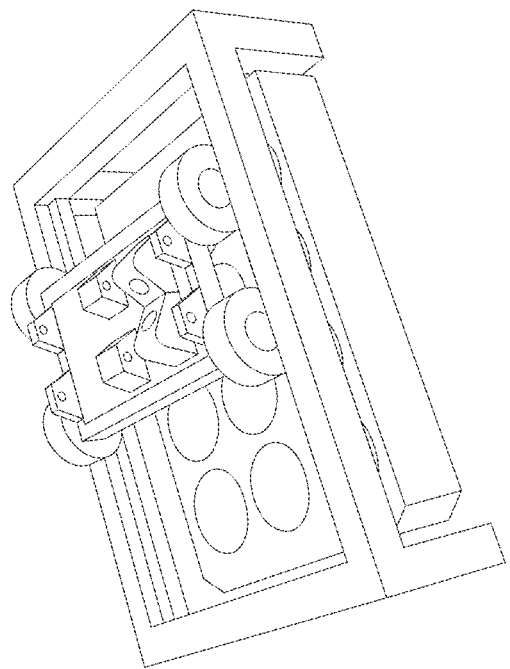
FIG. 13B is an illustration showing a fabricated model (12 wells).
Figure 13A:
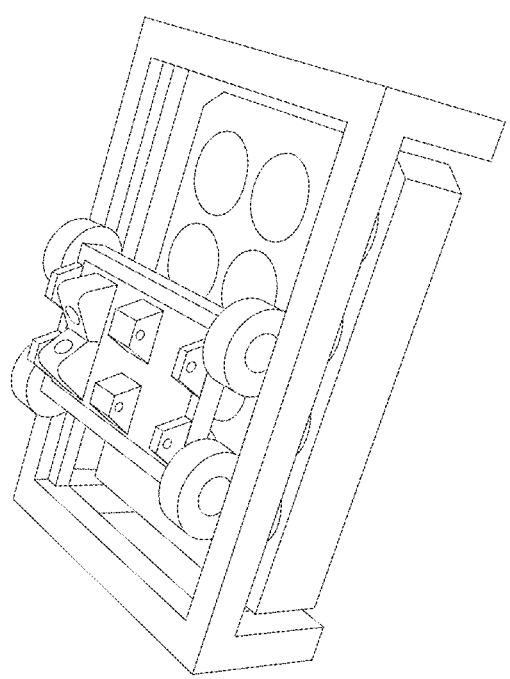
FIG. 13A is a schematic illustration of a computer-aided design model of cultureware accessory. The device was designed to hold probes in place while measuring to make smooth translations via ball bearings to other wells for analysis.
Figure 14A:
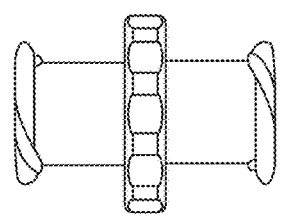
FIG. 14A is an illustration of a Luer type fitting channel machined to produce a syringe-based spectrometer.
Figure 14B:
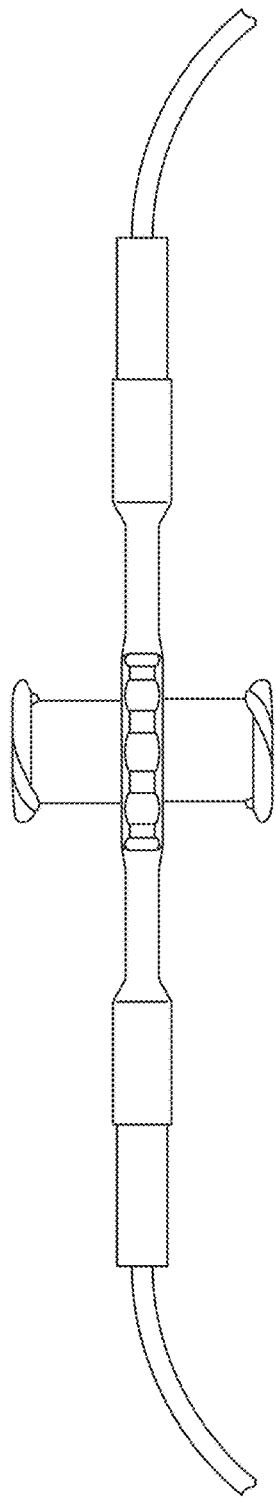
FIG. 14B is an illustration showing the Luer type fitting of FIG. 14A post-machining with jumper cables leading from electrodes to female connectors, themselves connecting to the coaxial probes.
Figure 14C:
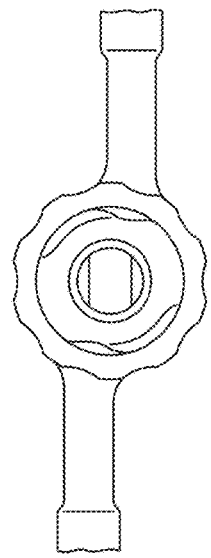
FIG. 14C is an illustration showing an axial view of a spectrometer showing electrodes embedded orthogonally in the channel. Center-to-center probe distance is approximately 5 mm (probe diameter is 1 mm).
Figure 14D:
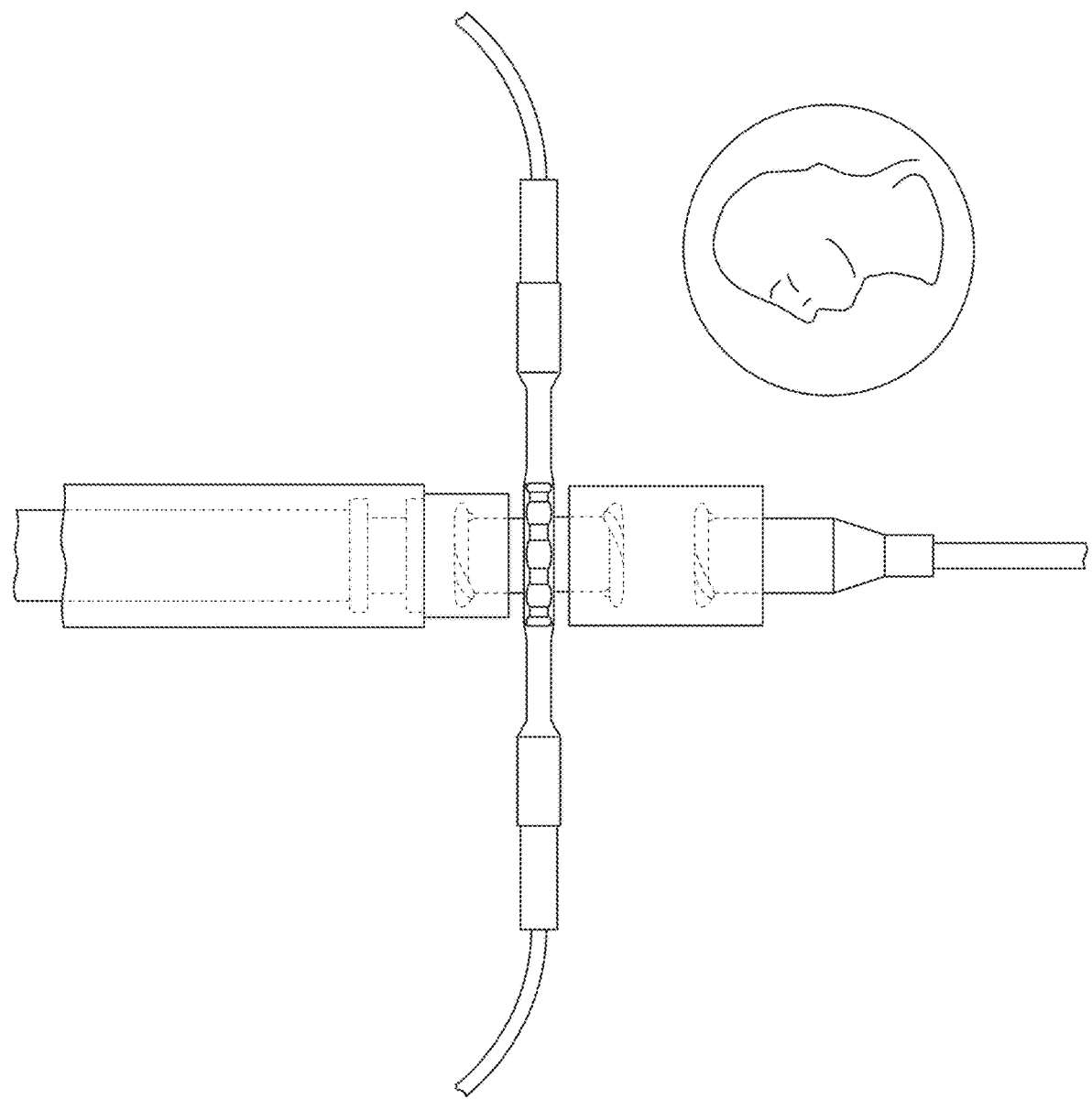
FIG. 14D is an illustration showing an assembled device next to a U.S. quarter dollar coin for scale. The transparent piece attached to the channel opposite the syringe is an adapter for the needle.

To assess the functionality of this cost-effective probe design as well as the Analog Discovery system, the complex impedance of cell-saline suspensions was measured. Sheep intervertebral disk cells ("IVD"s) were passed in accordance with Bowles, "Tissue-engineered Intervertebral Discs Produce New Matrix, Maintain Disc Height, and Restore Biomechanical Function to the Rodent Spine," *PNAS* 108: 13106-13111 (2011), which is hereby incorporated by reference in its entirety, and were suspended in 1 mL volumes at 10E6, 4E6, and 1E6 cells/mL, with two trials at each concentration. The samples were investigated in a 12-well plate, and the probes were held at fixed distance of 3 cm with the aid of a custom cultureware accessory (FIGS. 13A-B). Literature (e.g., Narayanan et al., "Label Free Process Monitoring of 3D Bioprinted Engineered Constructs Via Dielectric Impedance Spectroscopy," *Biofabrication* 10

(2018), which is hereby incorporated by reference in its entirety) indicates that the β-distribution of ac-generated field frequencies, roughly 100 kHz-10 MHz, is of biological relevance, and this was chosen to be the range of frequencies applied to measure impedance. A signal amplitude of 50 mV was chosen to minimize cell death induced from the application of the electric current. As a control, the impedance of sterile 1× phosphate-buffered saline (PBS) was also measured. Between each trial, the electrodes were removed from the cultureware accessory, rinsed in 70% ethanol to sterilize, and washed with sterile PBS.

Syringe-Based Spectrometer Fabrication

Following an investigation of EIS using common laboratory supplies, it was desirable to assess the ease with which the Analog Discovery platform could be integrated within a bioprinter environment. Commonly available bioprinters rely on syringes for extrusion of the construct precursor material, so a syringe-based impedance spectrometer design was sought (FIGS. 14A-D). A Luer locking channel with integrated electrodes was fabricated for this purpose, owing to the ubiquity of the Luer lock format in laboratory science and the affordability of the materials involved.

Holes (center-to-center distance of 5 mm) to integrate electrodes were machined in a cylindrical plastic Luer lock interface using a size 60 drill bit, with the same gold-plated VGA pins as had been used to complete the coaxial probes press fit into the newly evacuated holes (see FIG. 5D). The male terminals of a pair of male-to-female jumper cables were soldered to the exposed portion of the VGA pins, and each junction was covered in heat-shrink tubing. After applying heat, a final ring of epoxy at both tubing-channel interfaces waterproofed the component.

This syringe-based system was then used to investigate cell-saline suspensions. Due to cell availability at the time, bovine mesenchymal stems cells (MSCs) were used in place of the previously utilized ovine IVDs. The cells were diluted into their 1 mL experimental volumes such that 10E6, 5E6, and 1E6 cells/mL samples were created. Samples were individually aspirated, and the frequency sweep was performed. The syringe system, including impedance analyzer channel, was sterilized before and after every sample interrogation by aspirating a 70% ethanol solution and flushing with sterile PBS. As had been done with the coaxial probe experiments, sterile 1×PBS was again used as a control against which the data were to be normalized.

Coaxial Probe Experimental Results

Figure 15:
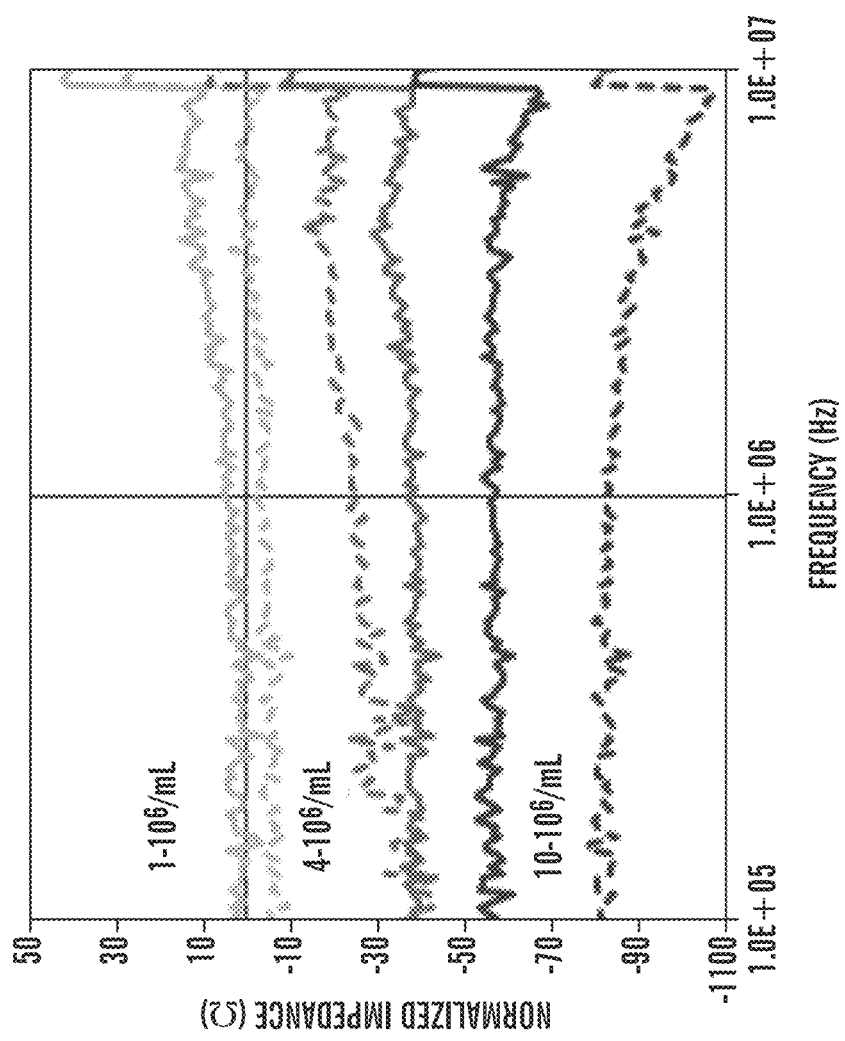
FIG. 15 is a graph showing normalized impedance measured by coaxial electrodes as a function of frequency for various cell concentrations. Two trials were performed at each concentration, and the solid and dashed pairs of monochromatic lines reflect this.
Figure 16:
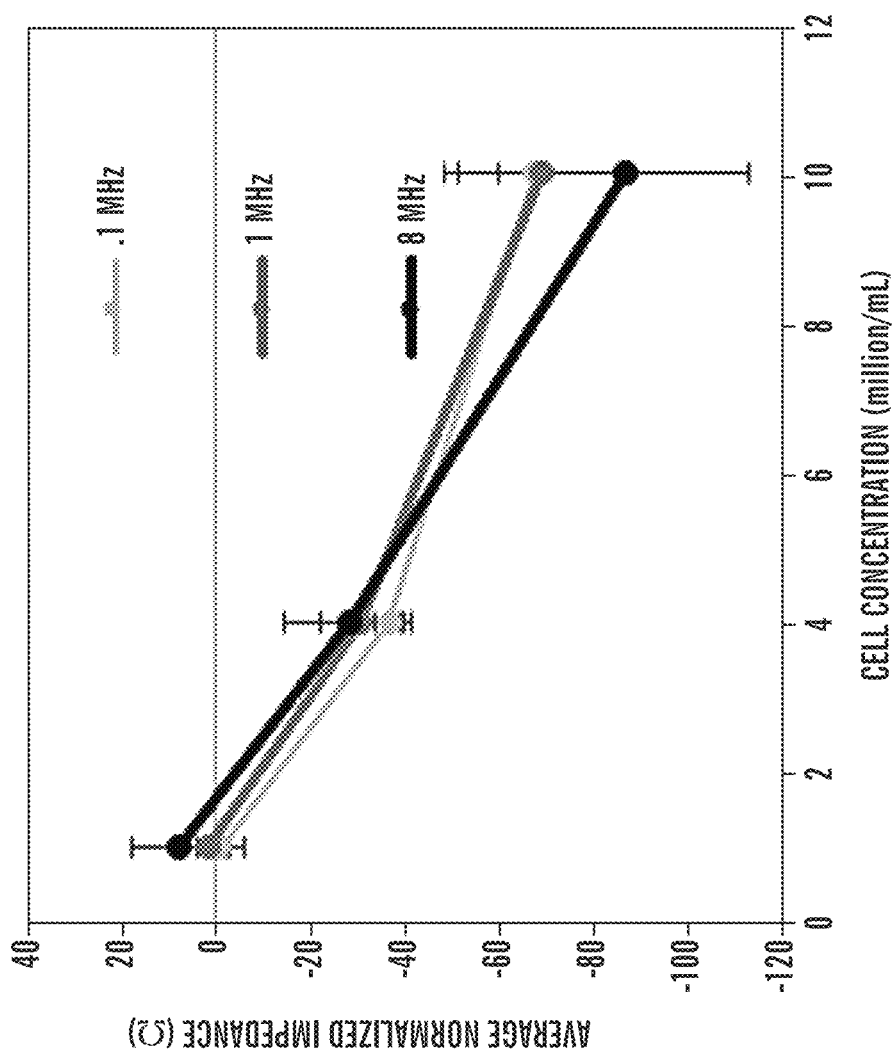
FIG. 16 is a graph showing the mean normalized impedance measured by coaxial electrodes as a function of cell concentration for various representative frequencies. Error bars are set to one standard deviation.

FIGS. 15 and 16 illustrate the relationships of interest to this work; namely, the magnitude of complex impedance $|\tilde{Z}|$ as a function of the dependent variables of cell concentration and applied frequency, respectively. FIGS. 15 and 16 report normalized impedance, $|\tilde{Z}|^{norm}$, which relates to the measured impedance of the DUT, $|\tilde{Z}|_{DUT}$, according to $$|\tilde{Z}|_{norm} = |\tilde{Z}|_{DUT} - |\tilde{Z}|_{PBS}, \quad (1)$$

where $|\tilde{Z}|_{PBS}$ is the impedance of the sterile PBS control. Thus, those impedance values near 0Ω in FIGS. 15 and 16 correspond to samples in which the cellular impedance contribution is minimal.

FIGS. 15 and 16 are intimately related. As mentioned, FIG. 15 gives normalized impedance of the DUT as a function of frequency. The different concentrations tested illustrate a descending trend in FIG. 15—the greater the tested cell concentration, the lower the impedance relative to background. This trend is visually more apparent in FIG. 16, in which the mean normalized impedance between both trials is plotted relative to cell concentration: a negative slope is present across the sample frequencies shown for all cell concentrations.

Syringe-Based Spectrometer Results

Figure 17:
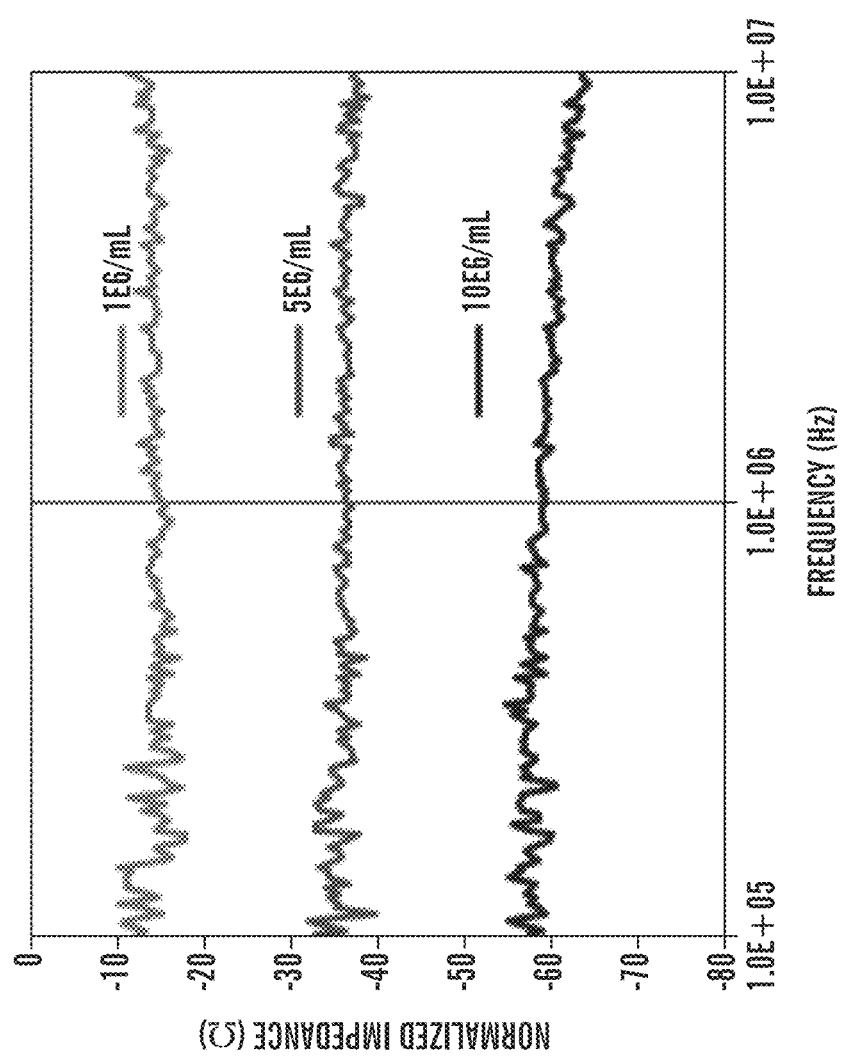
FIG. 17 is a graph showing normalized impedance measured by syringe-based spectrometer as a function of frequency for various cell concentrations. One trial was performed for each concentration.
Figure 18:
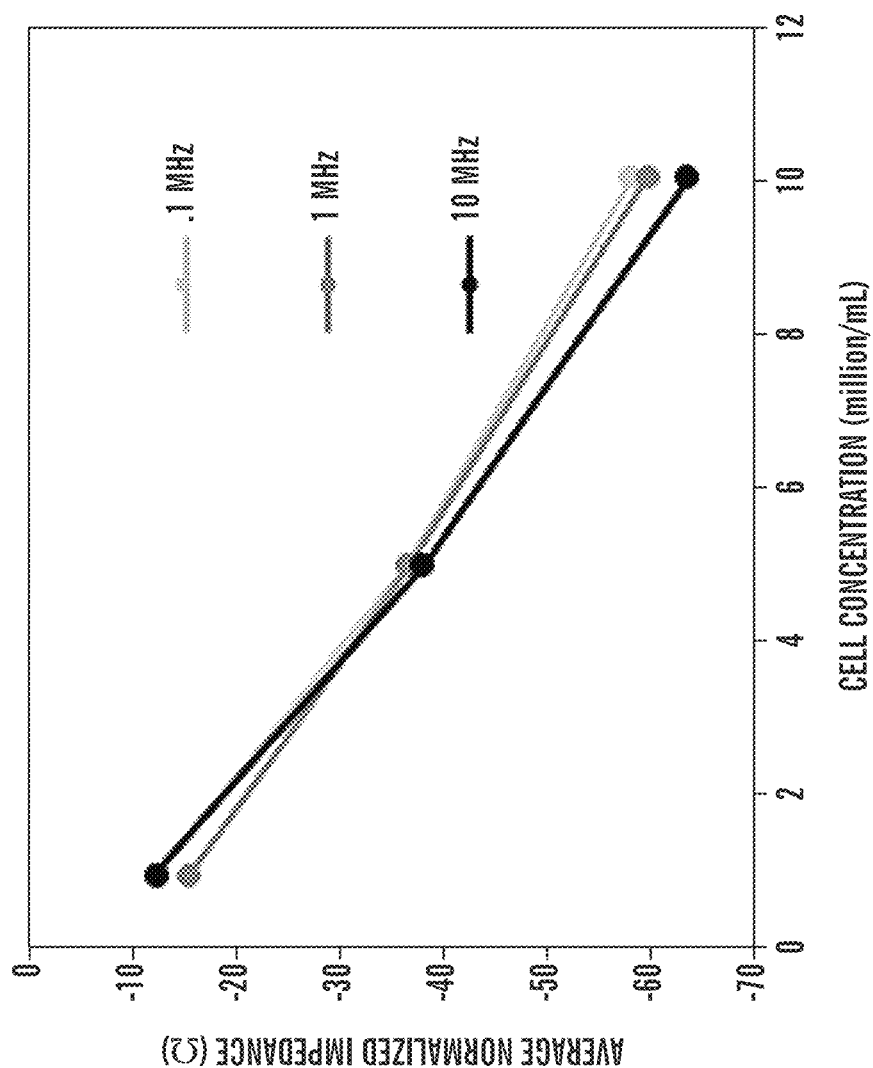
FIG. 18 is a graph showing normalized impedance measured by a syringe-based spectrometer as a function of cell concentration for various representative frequencies.

FIGS. 17 and 18 display the same functional relationships of interest as FIGS. 15 and 16 for the Luer lock impedance analyzer described above. The impedance data again were normalized according to Equation (1), supra. As one trial for each concentration was used, FIG. 18 provides recorded values, rather than a mean as in FIG. 15. The overall trends remain largely consistent between these data and that of FIG. 15 and FIG. 16, and although the number of trials is minimal.

Discussion

EIS techniques make use of the cell-induced changes in electrical impedance within a medium to determine information about the cells. However, the cellular contribution to the electrical properties of the suspending medium is complex, and arises from multiple, potentially competitive effects (Gu & Zhao, "Cellular Electrical Impedance Spectroscopy: An Emerging Technology of Microscale Biosensors," *Expert Review of Medical Devices* 7 (6): 767-779 (2010), which is hereby incorporated by reference in its entirety). These include an impeding effect from the insulating, dielectric cell membrane and a conducting effect from transmembrane ion release, the latter of these being proposed as a source for the decreasing impedance observed in cell suspensions such as those investigated in this work and published literature (Gu & Zhao, "Cellular Electrical Impedance Spectroscopy: An Emerging Technology of Microscale Biosensors," *Expert Review of Medical Devices* 7 (6): 767-779 (2010); Mansor, "Electrical Impedance Spectroscopy for Detection of Cells in Suspensions Using Microfluidic Device with Integrated Microneedles," *Applied Sciences* 7:170-180 (2017); Yang, "Electrical Impedance Spectroscopy for Detection of Bacterial Cells in Suspensions Using Interdigitated Microelectrodes," *Talanta* 74:1621-1629 (2008), which are hereby incorporated by reference in their entirety).

As an example from the literature, Mansor et al., "Electrical Impedance Spectroscopy for Detection of Cells in Suspensions Using Microfluidic Device with Integrated Microneedles," *Applied Sciences* 7:170 (2017), which is hereby incorporated by reference in its entirety, utilized a photolithography technique to fabricate microelectrodes in a similar physical arrangement to the syringe-based impedance analyzer described above, and suspended cells in DI water. A trend of decreasing impedance with increasing cell concentration was observed for a the investigated frequency range of 0.1-5 Mhz (Yang, "Electrical Impedance Spectroscopy for Detection of Bacterial Cells in Suspensions Using Interdigitated Microelectrodes," *Talanta* 74:1621-1629 (2008), which is hereby incorporated by reference in its entirety). In the data presented in FIGS. 15-18, similar trends are observed; increasing cell concentration leads to a decline in impedance across the frequency range scanned.

With variation in the impedance of cell suspensions discernable and the recorded trends corroborated in the literature, it was concluded that cell concentration in cell-saline suspensions can be reasonably approximated with a cost-effective syringe-based impedance spectrometer. This lends credence to the notion that EIS measurements taken on a low-cost, in-house spectrometer can serve effectively as an approach to bioprinter CQA monitoring.

Conclusion

This work investigated the feasibility of using electrical impedance spectroscopy to detect cell concentrations in a simple suspending medium as a proof of concept for an on-line, extremely affordable bioprinter cell detection system. A clear delineation in measured impedance with rudimentary coaxial probes encouraged the fabrication of a syringe-based impedance analyzer, which repackaged the coaxial probes in a convenient, affordable, and functional cellular impedance spectrometer.

This work demonstrates the potential of electrical impedance spectroscopy as a cost-effective and elegant solution to the unaddressed challenges present in bioprinting.

Example 2—Investigation of Sensitivity and Repeatability of Biomonitoring

Introduction

Syringe-based electrical impedance spectroscopy has been studied as a possible solution for the in-line monitoring of biological markers in samples of interest. Although previous experimental work has focused on the applicability of this approach to tissue engineering applications such as 3D bioprinting, in-line impedance spectroscopy has the potential to impact diverse areas such as disease detection, biological research, and general tissue construct quality control.

Experimental work described above demonstrated that cellular suspensions in saline had detectable differences in their electrical impedance which varied inversely with cell concentration. But this correlation goes against intuition and theory, as an increase in cell concentration increases the local density of capacitive elements in the suspension due to the innate capacitance of cell membranes, thereby increasing the overall electrical impedance of the sample. Regardless of this inconsistency, that trends could be observed in the data was a promising start.

Since developing a robust understanding of the impedance spectrometer's functionality and capability are important in its ongoing design process, the experimental work described in this example documents efforts taken to investigate the sensitivity and repeatability of experimental results. It serves as a point for reference for refining the technique or technology related to this form of biomonitoring.

Materials and Methods

Before experiments began, the syringe-based impedance spectrometer detailed in the report described in Example 1 above required repairs. Since their connections were corroded, the electrical leads in contact with the cell suspensions were replaced with similar electrical pin headers and soldered to the coax core using techniques described in previous work. The electrical connections to the leads were waterproofed to prevent shorting and were reinserted in the PTFE syringe adapter that formed the body of the previous iteration of the device. With the device repaired, experiments to clarify the relationship between electrical impedance and cell concentration across a broad range of cell concentrations began.

Baseline Characterization

Three experiments were performed. The first was designed to emulate past experiments and broadly characterize this new iteration of the device. P0 Bovine mesenchymal stem cells (MSCs) were thawed, plated, and harvested at 80% confluency. The cells were resuspended in 1× Dulbecco's phosphate-buffered saline (PBS) (Corning, Manassas, VA) and counted. By serial dilution into 1 mL volumes of this resuspension, three sample groups of $1\times10^6$ cells/mL, $4\times10^6$ cells/mL, and $10\times10^6$ cells/mL with two replicates each were formed. The assembled experimental setup included a blunt needle, the spectrometer channel itself, and a syringe to act as a reservoir for the samples and to serve as a source of suction. The electrical setup included the modified insulated coaxial cables, Analog Discovery 2 impedance analyzer detailed in examples above, and the same Waveforms control software (Digilent, Inc.) previously described. The Waveforms open circuit calibration was performed with a dry, empty spectrometer channel, and the short circuit calibration was performed using sterile PBS with 1 second averaging for accuracy. Thus, any measured deviation from zero impedance and zero phase during the experiment was a deviation from the background impedance of saline at that frequency.

The device was loaded with 70% ethanol and allowed to sit before the experiment. Before loading samples into the syringe, the ethanol was evacuated, and the channel was given two rinses of sterile PBS. The 1 mL samples were then loaded individually into the spectrometer through the needle by using the suction of the syringe; between samples, the syringe was emptied, filled with 70% ethanol, and again twice rinsed with PBS. 201 sample points with 100 ms averaging across the frequency range of 100 kHz-10 MHz at a signal amplitude of 50 mV were selected to plot the results. This served as a balance between signal noise attenuation and the time required to sweep through the frequency range.

All work concerning cell harvesting and serial dilution was performed under sterile conditions, but the experiment itself was performed on a clean benchtop outside of a sterile biosafety cabinet. The cells were loaded into the syringe from lowest to highest concentration to minimize the impact of previous measurements on the measured impedance of the sample under test.

High Cell Concentration Assessment

The second experiment was a scaled version of the first, designed to assess more rigorously the spectrometer's sensitivity through the interrogation of a broad range of cell concentrations with a more significant number of replicates per concentration. Bovine chondrocytes harvested from articular cartilage were resuspended in PBS and serially diluted to form 1 mL samples of $50\times10^6$, $10\times10^6$, and $1\times10^6$ cells/mL, with 5 replicates of each, for a total of fifteen individual samples.

The spectrometer was loaded and evacuated before and in between trials in the same manner as described above. A total of 501 sample points were chosen for plotting instead of 201 to increase data fidelity, but other than this the Waveforms settings remained unchanged between these two experiments.

Systematic Error Detection

The third experiment was based on observations and analysis of the previous two as well as past work and dealt with identifying sources of error in the spectrometer itself. Specifically, the third experiment investigated the potential effect of the sequence in which samples were interrogated on the measured impedance, as it was noted in the previous experiments that, throughout the runtime of an experiment, measurements drifted as a function of experiment time more so than frequency or cell concentration.

P2 Bovine MSCs were harvested at 80% confluency and resuspended in 1× PBS. The cell suspension was serially diluted to form two groups of $10\times10^6$ and $20\times10^6$ cells/mL with two replicates of 1 mL each, for a total of four samples. As before, the spectrometer was normalized to sterile PBS, the lower concentration groups were passed through the spectrometer first, and the spectrometer channel was cleaned in between trials as described above. After processing all cell suspensions and cleaning a final time, the complex impedance of another sample from the same bottle of sterile PBS as was used in the calibration of background impedance was measured to determine if impedance measurements were drifting systemically throughout the experiment as a function of time. The Waveforms settings between this experiment and those of the baseline characterization were identical.

Results

Characterization Study

The results of the first experiment are shown in FIG. 18; the magnitude of the measured impedance deviation from sterile PBS was found to increase with increasing cell concentration, in contrast with past results but in agreement with theory. This trend is both nonlinear in cell concentration with perhaps some dependence on frequency. The two replicates at each concentration ($1\times10^6$, $4\times10^6$, $10\times10^6$ cells/mL) are identified by the legend in the sequence they were performed relative to each other, i.e.: (1) indicates the first of the pair to be measured. Because the samples were processed from lowest to highest concentration, these results show a monotonically increasing trend between the order in which a sample was passed through the spectrometer and the measured impedance.

High Cell Concentration Study

The results of the second cell study involving more replicates and larger cell concentrations do not show a correlation between cell concentration and measured impedance (FIG. 20), in contrast with the first experiment. The solid lines in FIG. 20 indicate the mean of the five replicates for each group normalized to sterile PBS, and the dashed lines represent a standard deviation above or below the mean for their respectively colored group. The mean measured impedance of the $10\times10^6$ cells/mL group was the largest of all tested groups across the frequencies investigated, and the measured impedance of the $50\times10^6$ cells/mL group the least. The only mean values that did not fall within the standard deviation of another were those of the $10\times10^6$ cell/mL group. As a function of increasing frequency, all groups showed a monotonically decreasing trend, in contrast to the previous, lower concentration study.

Sequential Correlation Study

Figure 19:
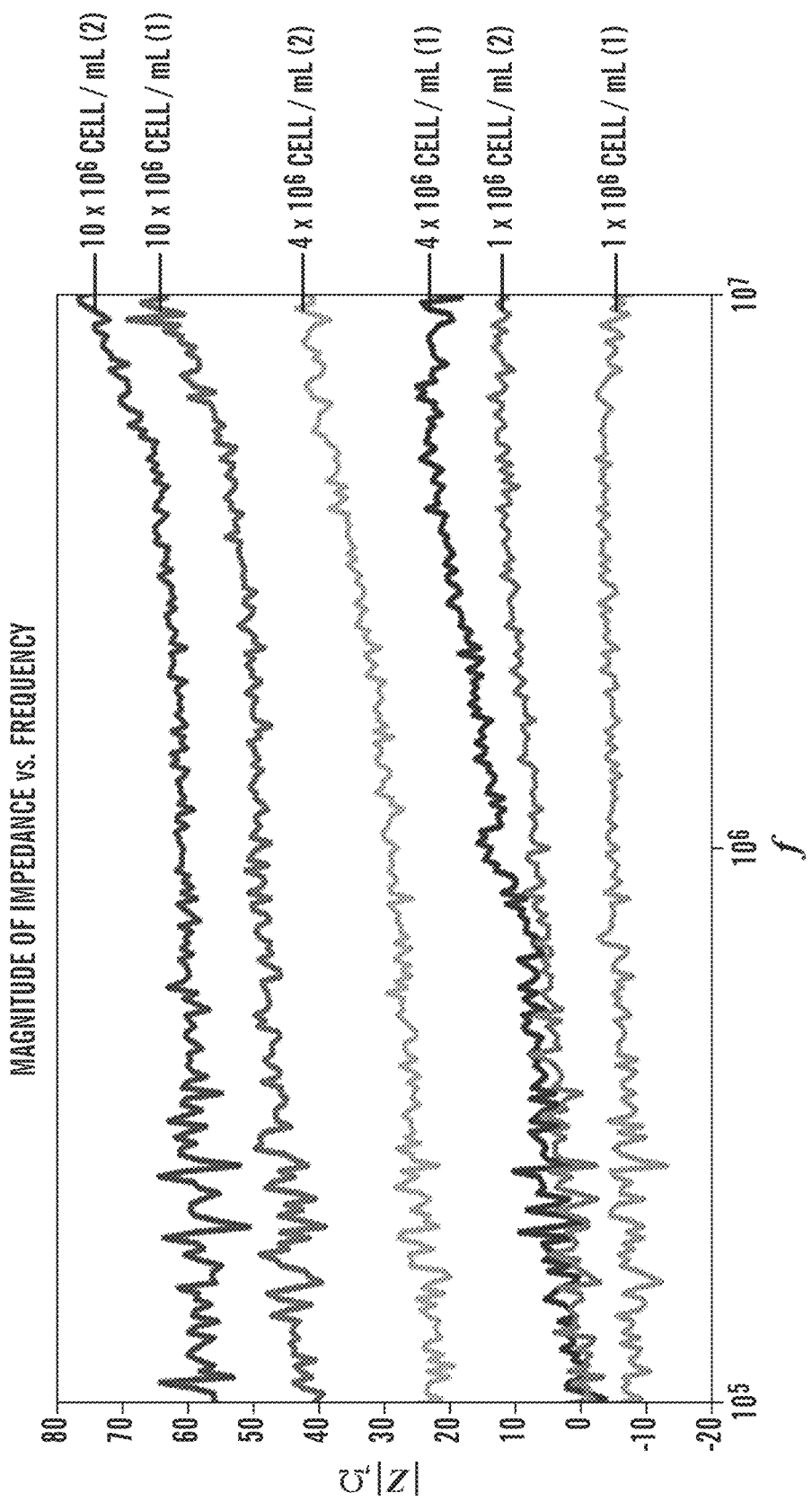
FIG. 19 is a graph showing the results of a characterization study showing increased measured impedance relative to sterile PBS background with increasing cell concentration. The vertical axis is the magnitude of complex impedance in ohms and the horizontal axis is frequency in hertz. Note the log scale horizontal axis and linear scale vertical axis; a linear axis was chosen to represent the negative impedances relative to background at low concentration.
Figure 21:
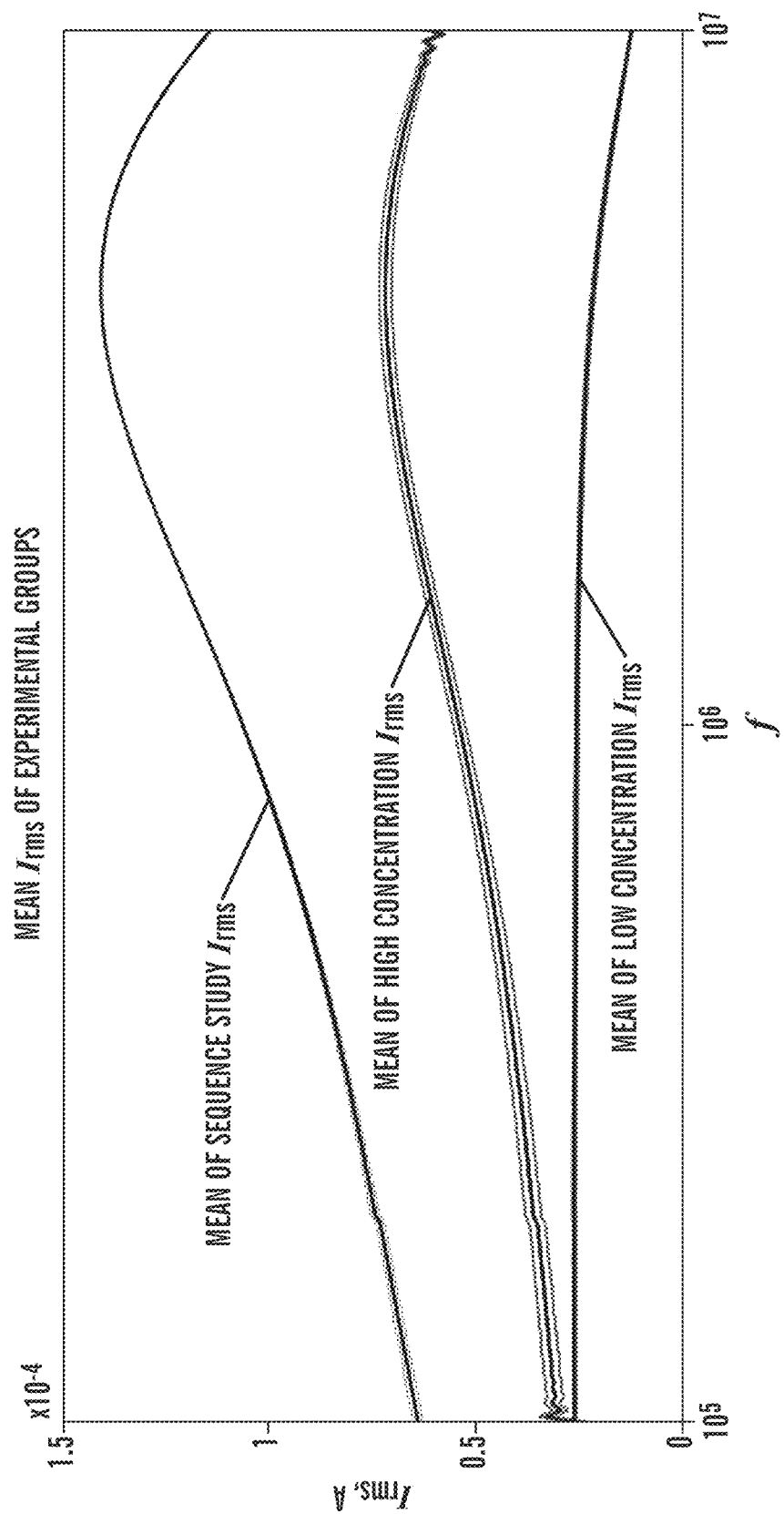
FIG. 21 is a graph showing the average current vs. frequency for various experiments performed.

A general increasing trend of measured impedance as a function of sample ordering was observed at low frequencies, but this did not hold at the higher frequencies measured (FIG. 21). The impedance of the PBS control was the highest of all groups until about $1\times10^6$ Hz; this low frequency portion of the spectral data was ignored in FIG. 19 for the level of noise it presented, but it is included here for the sake of discussion. Above $1\times10^6$ Hz, the measured impedance of the PBS approaches zero (i.e., background) at a greater rate than the other samples. The first sample ($10\times10^6$ cells/mL (1)) had measured impedance magnitudes far below all other groups but converged towards the single-digit impedances of the others at high frequencies. All groups including the PBS control were within an order of magnitude of each other above $1\times10^6$ Hz.

Discussion

The work described here, with its inclusion of the high concentration samples and characterization of the spectrometer's behavior with externalities such as time, made efforts to address these challenges by working to understand perennial inconsistencies in the spectrometer's measurements with the goal of informing future design decisions.

An important finding is that high cell concentration experiments with a significant number of experimental groups do not demonstrate the same trends as lower concentration groups. This indicates that for the cell concentrations relevant to tissue engineering used in these experiments, a primary impediment to data consistency between experiments may not lie in issues of device sensitivity. Further, based on FIG. 20, any experimental artifact due to the order in which the samples were passed does not appear to drastically alter measured impedances at higher frequencies (which are generally considered more robust measurements as the interfering double-layer capacitances of the electrode-sample interface are minimized in this domain). Thus, based on FIGS. 19-21, an explanation for the previous inconsistencies in the spectral impedance data remains elusive.

According to impedance spectroscopy theory, increasing suspended cell concentration in a conductive medium such as PBS should increase the measured impedance of the samples, assuming the cell membranes remain intact. Thus, there is a dissonance between the results of the first experiment, which demonstrated general agreement with theory, and the second experiment, which provided no such trend in the face of even greater cell concentrations. This seemingly sporadic agreement of experiments with the theoretical model suggests the existence of competitive impedances in the cell suspensions at time of measurement. Past work, based on speculation in the literature, suggested that ionic release due to cell metabolism could account for the impedance decreasing with increased cell concentration, but the variation between the results of the first and third experiment, which tested the same cell type under the same conditions, show this may not be an effectual source of interference since these experiments diverged at higher frequencies. At the highest frequencies tested, the difference between the impedance relative to background reported in the first experiment and of that reported in the third was nearly two orders of magnitude.

An early concern during spectrometer design never conclusively settled was that of spectrometer induced cell death due to the destructive effect of electric fields on cell membranes in solutions with mobile charges such as the PBS used here. Indeed, a group working with microfluidic impedance spectroscopy used the technology specifically to measure the efficacy of electrically-induced cell lysis; their results show a compelling correlation between rates of cell lysis and a decrease in impedance of the cell suspension (Ameri et al., "All Electronic Approach for High-throughput Cell Trapping and Lysis with Electrical Impedance Monitoring," *Biosens. Bioelectron.* 54:462-467 (2014), which is hereby incorporated by reference in its entirety).

It is not unreasonable to imagine a positive feedback effect where some initial cell death leads to a decrease in the electrical impedance of the sample, leading to more electrical energy being communicated, and so on. In such a scenario, one would expect the impedance to go down with time exponentially, or equivalently, for the current to rise exponentially.

Figure 20:
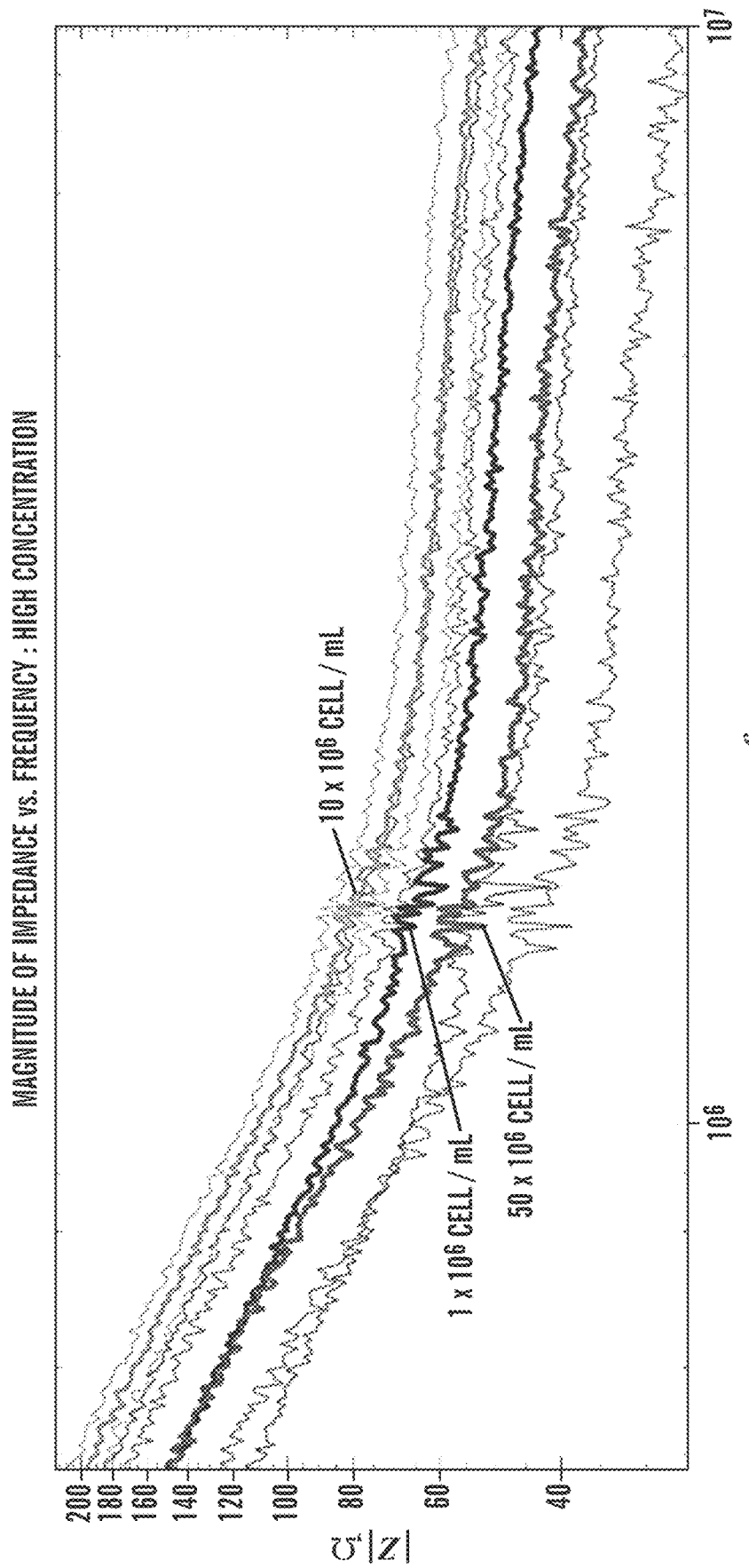
FIG. 20 is a graph showing that no discernable trend exists between cell concentration and measured impedance for the high concentration study. Solid lines indicate averages of the five replicates for each concentration, and dashed lines represent one standard deviation above or below the mean. All impedances normalized to sterile PBS. The graph is cropped on the low end of the frequency sweep for readability due to the large amounts of signal noise generated at low frequencies by aqueous electrode interfaces.

Because the frequency sweep in FIGS. 20 and 21 took place in logarithmic time from lowest to highest frequency and these figures report negative linear slopes on a log-log scale, they imply an exponential decrease in impedance with time for these experiments. The current similarly meets the predictions of a hypothetical positive feedback model, as FIG. 21 shows for the semilog plot of mean $I_{RMS}$ across all studies. Given a sufficiently high initial current, the impedance increases until high frequencies (when possible competitive effects from decreasing capacitance become influential), but a sufficiently low initial current results in stable impedance throughout the experiment (low concentration study).

Conclusion

The impedance spectrometer presented in this work is a complicated design project that exists at the intersection of multiple disciplines. If found to be biologically destructive, design decisions to increase the base impedance of the device should be considered, which may involve both mechanical and electrical alterations to the system. Once cell death due to the device is minimized, studies assessing the ability of the spectrometer may resume and meaningfully inform development of this promising platform.

Example 4—Experimental Procedures to Determine Ability to Monitor Biologically Relevant Attributes of a Cell-containing Biological Material Systems described herein may be tested by a variety of experimental procedures designed to determine their ability to monitor biologically relevant attributes of a cell-containing biological material. An experimental procedure using any syringe-based impedance spectrometer will involve exposure of a cell-laden medium to an electric field, but beyond that the protocol will vary by experimenter need. Below is the protocol used for all experiments involving the devices described in the examples. The protocol is not likely to differ materially between device embodiments, cell types, cell suspension medium, or control software for the aspiration experiment described, but applications related to bioprinting or other biosensing in general may require non-trivial modifications.

1. Prepare the device by assembling it with a syringe and blunt needle. Using the needle, aspirate a full syringe of ethanol. Let the full syringe sit with needle submerged in a beaker of ethanol for some time before starting the experiment.

2. Cells are trypsinized and counted according to established protocols. A conical tube containing cells and residual growth media is spun in a centrifuge at 2000 RPM for 5 minutes to form a pellet of cells.

3. While spinning, the necessary volume for resuspension after spinning should be found. For example, if 50 million cells are being spun and one wishes for two groups of 20 million cells/mL, 2 groups of 4 million cells/mL, and two groups of 1 million cells/mL, then the cells should be first resuspended in 2.5 mL (the volume needed to resuspend 50 million cells at 20 million/mL), the desired two mL groups should be removed, and then the process is repeated recursively until all experimental groups have been made.

4. Also while spinning, prepare a few hundred milliliters of sterile PBS and ethanol in beakers on a clean benchtop, and have an empty beaker on hand for waste.

5. After spinning, the supernatant is aspirated, and the cells are resuspended and distributed into conical tubes reasonable for the volume considered and according to the process described in (2). The measurements following this are taken in a clean but not sterile environment.

6. The samples can now be serially processed by the device. Connect the device to the controlling computer. Note that the samples were processed from lowest concentration to highest to minimize the impact of holdover cells from previous trials on the measured impedance of successive samples.

a. First, empty the syringe of its ethanol and slowly aspirate a full syringe-worth of PBS from the beaker prepared in (3), being sure to submerge the blunt needle tip fully (i.e., to the plastic base) in the PBS to wash the exterior of excess ethanol. Slowly empty the contents of the syringe in the waste beaker.

b. Aspirate the next lowest concentration sample from its conical tube, being sure to fill the cell-counting region of the syringe/device assembly. There should be no bubbles in this portion of the device. (Pointing the syringe tip upward and extruding small amounts of sample while tapping the syringe can help eliminate bubbles).

c. Begin the experiment by starting the frequency sweep using the device's control software. If the experiment requires a manually driven flow condition, begin extruding the material at this point. Wait for the sweep to complete; this may take some time depending on how low the frequencies are and how much averaging is performed by the control software.

d. Once the sweep is complete, empty the contents of the syringe in the waste beaker. Slowly aspirate a full syringe of ethanol from the beaker prepared in (3). Wait some time and then repeat (a-d) until all samples have been processed.

What is claimed is:

1. A system for collecting or extruding a cell-containing biological material, said system comprising:
   an extrusion/collection device comprising:
     an orifice and
     a chamber operably connected to the orifice and
   an electrical impedance spectroscopy (EIS) device, operably connected to the extrusion/collection device;
   wherein the EIS device monitors biologically relevant attributes of a cell-containing biological material as it is extruded from or collected into the extrusion/collection device, and wherein the extrusion/collection device is capable of any one or more of the following operations: varying the flow rate of the cell-containing biological material from or into the extrusion/collection device, varying the quantity of cells in the cell-containing biological material being extruded from or collected into the extrusion/collection device, and varying the pressure of the cell-containing biological material as it is extruded from or collected into the extrusion/collection device.

2. The system according to claim 1, wherein the extrusion/collection device is a syringe.

3. The system according to claim 2, wherein the extrusion/collection device further comprises a fitting for connecting a cannula to the syringe.

4. The system according to claim 3, wherein the fitting is a Luer taper fitting.

5. The system according to claim 3, wherein the fitting comprises a passage through which the cell-containing biological material passes when it is extruded from or collected into the extrusion/collection device.

6. The system according to claim 5, wherein the fitting comprises anti-parallel electrodes positioned in the passage to create an electrical field for detecting impedance of the cell-containing biological material.

7. The system according to claim 1 further comprising:
   a system controller comprising a processor and a memory electrically connected to the EIS device, the system controller comprising a memory comprising programmed instructions stored thereon and one or more processors configured to be capable of executing the stored programmed instructions to:
receive one or more of the biologically relevant attributes of the cell-containing biological material from the EIS device; and
provide instructions to adjust one or more operations of the extrusion/collection device based on the received one or more biologically relevant attributes.

8. The system according to claim 1, wherein the EIS device is an extrusion device, and said EIS device monitors biologically relevant attributes of the cell-containing biological material as it is extruded from the extrusion device.

9. The system according to claim 8, wherein the extrusion device is a bioprinter.

10. The system according to claim 1, wherein the EIS device is a collection device, and said EIS device monitors biologically relevant attributes of a cell-containing material as it is collected into the collection device.

11. The system according to claim 1, wherein the biologically relevant attributes are selected from the group consisting of cell viability, cell count, cell type, cell purity, and combinations thereof.

12. A method of depositing a cell-containing biological material, said method comprising:
providing the system according to claim 8;
extruding from the extrusion device a cell-containing biological material; and
monitoring biologically relevant attributes of the cell-containing biological material as it is extruded from the extrusion device.

13. The method according to claim 12, wherein the cell-containing biological material is a cell-seeded hydrogel.

14. The method according to claim 13, wherein the hydrogel is selected from the group consisting of alginate, agarose, collagen, chitosan, fibrin, hyaluronic acid, carrageenan, polyethylene oxide, polypropylene oxide, polyethylene oxide-co-polypropylene oxide, hydroxypropyl methyl cellulose, poly(propylene fumarate-co-ethylene glycol), poly(ethylene glycol)-co-poly(lactic acid), poly(vinyl alcohol), KDL12 oligopeptides, poly(n-isopropyl acrylamide), and combinations thereof.

15. The method according to claim 12, wherein said depositing comprises printing a living, three-dimensional tissue.

16. The method according to claim 12, wherein said cell-containing biological material is a cell therapy composition.

17. The method according to claim 16, wherein said extruding comprises extruding the cell-containing biological material into a subject to administer cell therapy treatment.

18. The method according to claim 12, wherein the biologically relevant attributes are selected from the group consisting of cell viability, cell count, cell type, cell purity, and combinations thereof.

19. The method according to claim 12 further comprising:
adjusting the extrusion of the cell-containing biological material based on the monitored biologically relevant attributes of the cell-containing biological material.

20. A method of collecting a cell-containing biological material, said method comprising:
providing the system according to claim 10;
collecting into the collection device a cell-containing biological material; and
monitoring biologically relevant attributes of the cell-containing biological material as it is collected into the collection device.

21. The method according to claim 20, wherein the biologically relevant attributes are selected from the group consisting of cell viability, cell count, cell type, cell purity, and combinations thereof.

22. The method according to claim 21 further comprising:
adjusting the collection of the cell-containing biological material based on the monitored biologically relevant attributes of the cell-containing biological material.

23. A system for collecting or extruding a cell-containing biological material, said system comprising:
a syringe device comprising:
a housing having opposed distal and proximal ends, wherein said distal end is provided with an orifice;
a fitting connected at the orifice for interchangeably connecting a needle;
a plunger axially movable within the housing between an advanced position near the distal end and a retracted position near the proximal end;
an elongate rod being connected to said plunger to move said plunger axially between the advanced and retracted positions, and extending through the proximal end of said housing; and
an electrical impedance spectroscopy (EIS) device operably connected to the syringe device at the fitting, wherein the EIS device comprises anti-parallel electrodes positioned in the fitting to create an electrical field for detecting impedance of a cell-containing biological material as it is extruded from or collected into the syringe device;
and wherein the syringe device is capable of any one or more of the following operations: varying the flow rate of the cell-containing biological material from or into the syringe device, varying the quantity of cells in the cell-containing biological material being extruded from or collected into the syringe device, and varying the pressure of the cell-containing biological material as it is extruded from or collected into the syringe device.

24. The system according to claim 23, wherein the fitting is a Luer taper fitting.

25. The system according to claim 23 further comprising:
a system controller comprising a processor and a memory electrically connected to the EIS device, the system controller comprising a memory comprising programmed instructions stored thereon and one or more processors configured to be capable of executing the stored programmed instructions to:
receive one or more biologically relevant attributes of the cell-containing biological material from the EIS device; and
provide instructions to adjust one or more operations of the syringe device based on the received one or more biologically relevant attributes.

26. An electrical impedance spectroscopy (EIS) device connectable to an extrusion/collection device, wherein the EIS device comprises anti-parallel electrodes configured to create an electrical field around a fluid passageway for detecting impedance of a cell-containing biological material as it moves through the passageway;
and wherein the extrusion/collection device is capable of any one or more of the following operations: varying the flow rate of the cell-containing biological material from or into the extrusion/collection device, varying the quantity of cells in the cell-containing biological material being extruded from or collected into the extrusion/collection device, and varying the pressure of the cell-containing biological material as it is extruded from or collected into the extrusion/collection device.

27. The EIS device according to claim 26 further comprising:
   a system controller comprising a processor and a memory electrically connected to the EIS device, the system controller comprising a memory comprising programmed instructions stored thereon and one or more processors configured to be capable of executing the stored programmed instructions to receive one or more biologically relevant attributes of a cell-containing biological material from the EIS device.

28. The EIS device according to claim 27, wherein the biologically relevant attributes are selected from the group consisting of cell viability, cell count, cell type, cell purity, and combinations thereof.

\* \* \* \* \*